(12) United States Patent
Cairl

(10) Patent No.: US 11,748,903 B2
(45) Date of Patent: Sep. 5, 2023

(54) SYSTEM AND METHOD FOR ROBOTIC OBJECT DETECTION USING A CONVOLUTIONAL NEURAL NETWORK

(71) Applicant: Fetch Robotics, Inc., San Jose, CA (US)

(72) Inventor: Brian Cairl, Astoria, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 807 days.

(21) Appl. No.: 16/732,322

(22) Filed: Jan. 1, 2020

(65) Prior Publication Data
US 2020/0211217 A1 Jul. 2, 2020

Related U.S. Application Data

(60) Provisional application No. 62/787,588, filed on Jan. 2, 2019.

(51) Int. Cl.
*G06T 7/70* (2017.01)
*G01S 17/89* (2020.01)
(Continued)

(52) U.S. Cl.
CPC ............... *G06T 7/70* (2017.01); *G01S 17/89* (2013.01); *G01S 17/931* (2020.01);
(Continued)

(58) Field of Classification Search
CPC ............ G06T 7/70; G06T 2207/10028; G06T 2207/20081; G06T 2207/20084;
(Continued)

(56) References Cited

U.S. PATENT DOCUMENTS 9,873,196 B2 * 1/2018 Szatmary ............ B25J 11/0085
10,459,080 B1 * 10/2019 Schwesig ............... G01S 7/412
(Continued)

FOREIGN PATENT DOCUMENTS

CA 2683726 A1 * 10/2008 ........... G01C 15/002
CA 3073920 C * 12/2020 ........... B25J 9/1666
(Continued)

*Primary Examiner* — Mahendra R Patel

(57) ABSTRACT

A system includes a mobile robot, the robot comprising a sensor; and a server operably connected to the robot over a network, the robot being configured to detect an object by processing sensor data using a convolutional neural network. A pipeline for robotic object detection using a convolutional neural network includes: a system comprising a mobile robot, the robot comprising a sensor, the system further comprising a server operably connected to the robot over a network, the robot being configured to detect an object by processing sensor data using a pipeline, the pipeline comprising a convolutional neural network, the pipeline configured to perform a data collection step, the pipeline further configured to perform a data transformation step, the pipeline further configured to perform a convolutional neural network step, the pipeline further configured to perform a network output transformation step, the pipeline further configured to perform a results output step.

5 Claims, 13 Drawing Sheets

(51) Int. Cl.
*G05D 1/02* (2020.01)
*G01S 17/931* (2020.01)
*G06N 3/04* (2023.01)
*G06N 3/08* (2023.01)
*G06N 3/008* (2023.01)
*G06N 3/048* (2023.01)
*G05D 1/00* (2006.01)

(52) U.S. Cl.
CPC ......... *G05D 1/0214* (2013.01); *G05D 1/0221* (2013.01); *G05D 1/0297* (2013.01); *G06N 3/008* (2013.01); *G06N 3/04* (2013.01); *G06N 3/048* (2023.01); *G06N 3/08* (2013.01); *G05D 1/0088* (2013.01); *G05D 2201/0216* (2013.01); *G06T 2207/10028* (2013.01); *G06T 2207/20081* (2013.01); *G06T 2207/20084* (2013.01); *G06T 2207/30261* (2013.01)

(58) Field of Classification Search
CPC . G06T 2207/30261; G06T 7/73; G01S 17/89; G01S 17/931; G01S 7/4802; G01S 17/42; G05D 1/0214; G05D 1/0221; G05D 1/0297; G05D 1/0088; G05D 2201/0216; G05D 1/024; G06N 3/008; G06N 3/04; G06N 3/048; G06N 3/08; G06N 3/045; G06N 3/047

USPC .......................................................... 382/103
See application file for complete search history.

(56) References Cited

U.S. PATENT DOCUMENTS

| | | | | |
|---|---|---|---|---|
| 10,535,138 | B2 * | 1/2020 | Pfeiffer | G06V 20/56 |
| 10,664,061 | B2 * | 5/2020 | Poupyrev | G01S 13/88 |
| 10,796,201 | B2 * | 10/2020 | Li | G05D 1/0274 |
| 10,824,862 | B2 * | 11/2020 | Qi | G06V 10/82 |
| 11,017,550 | B2 * | 5/2021 | Frossard | G06N 3/045 |
| 11,475,351 | B2 * | 10/2022 | Luo | G06V 10/82 |
| 11,537,868 | B2 * | 12/2022 | Arditi | G06F 16/29 |
| 11,592,524 | B2 * | 2/2023 | Chen | G01S 7/4802 |
| 2016/0180195 | A1 * | 6/2016 | Martinson | G06V 10/764 |
| | | | | 382/103 |
| 2017/0024877 | A1 * | 1/2017 | Versace | G06N 3/008 |
| 2017/0213070 | A1 * | 7/2017 | Aghamohammadi | |
| | | | | G06V 10/42 |
| 2018/0232947 | A1 * | 8/2018 | Nehmadi | G01S 7/295 |

FOREIGN PATENT DOCUMENTS

| | | | | |
|---|---|---|---|---|
| EP | 4123616 A1 * | 1/2023 | | G06F 15/76 |
| JP | 2017050018 A * | 3/2017 | | B25J 11/009 |
| WO | WO-2015143173 A2 * | 9/2015 | | G01S 13/86 |
| WO | WO-2019113074 A1 * | 6/2019 | | B25J 9/163 |

* cited by examiner

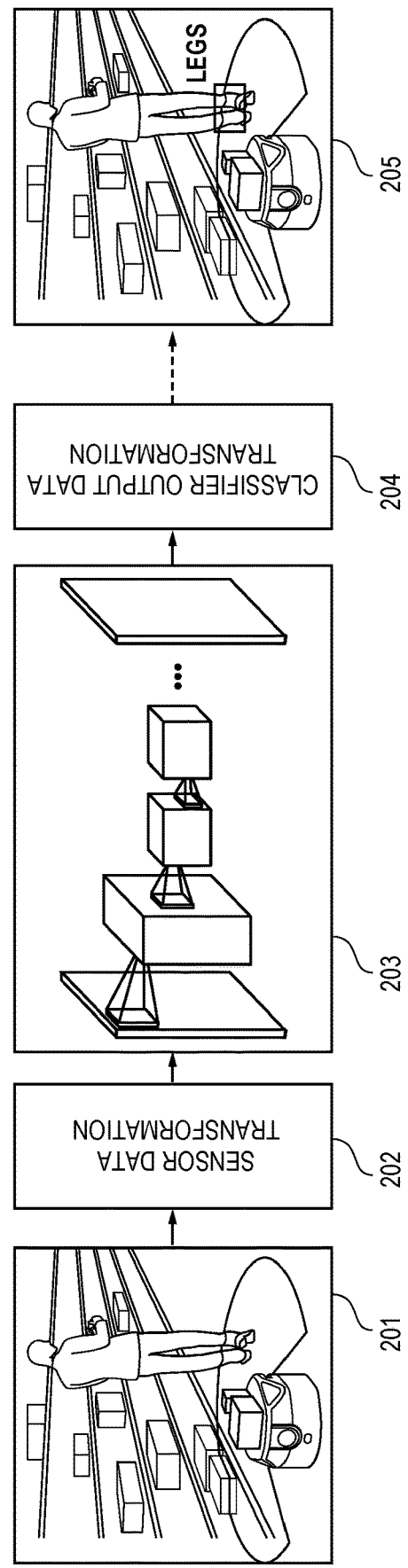

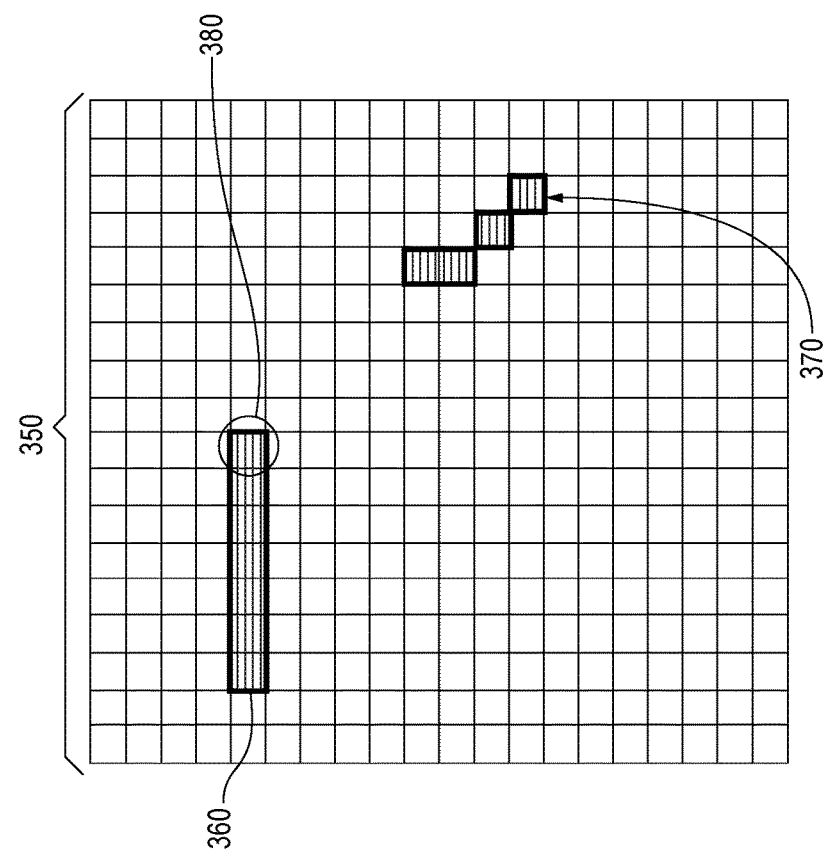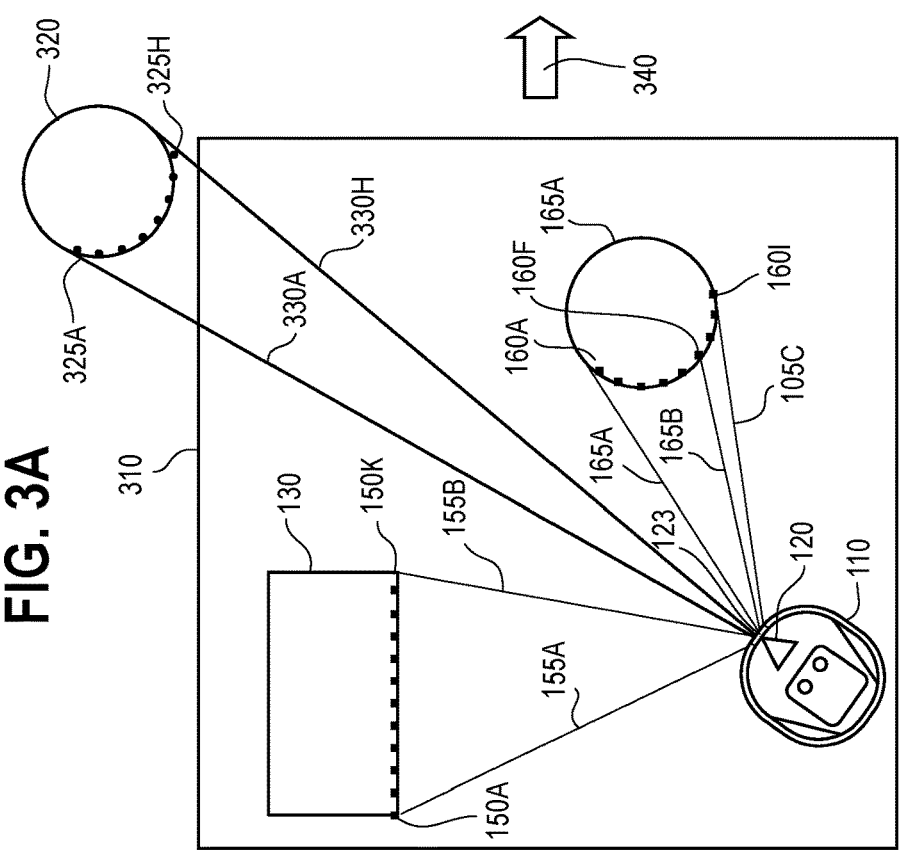

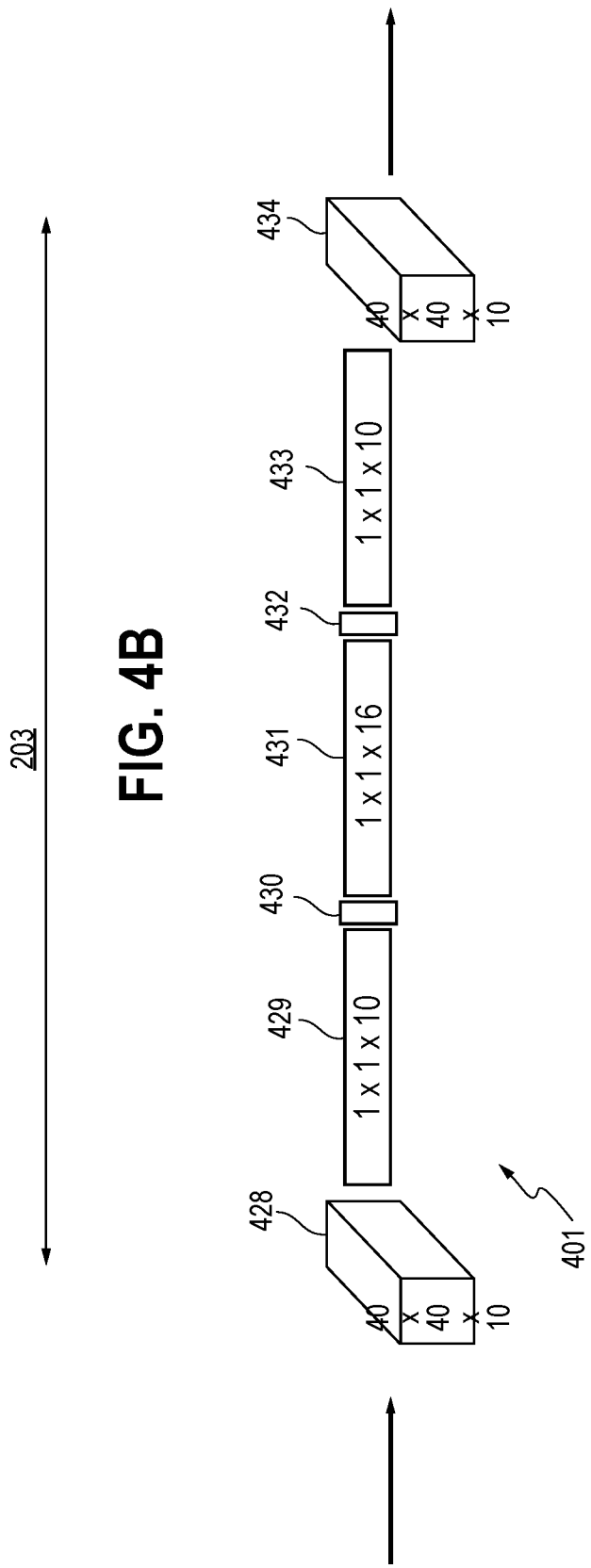

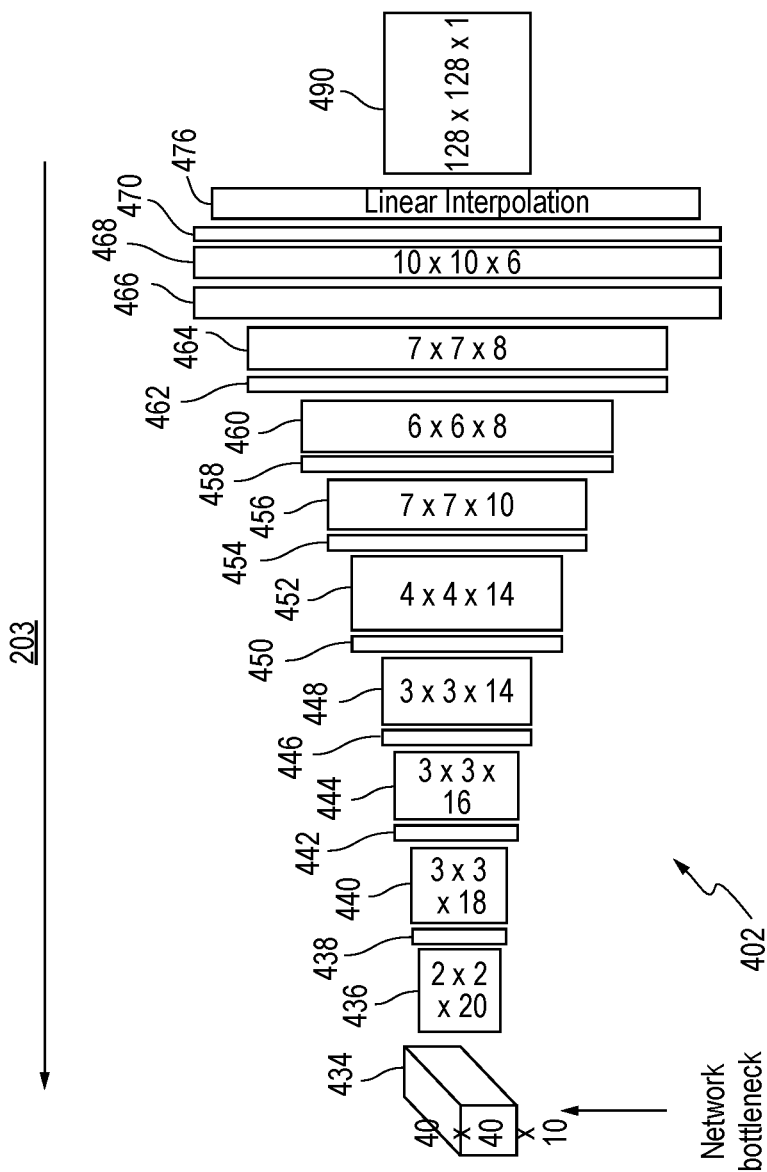

SYSTEM AND METHOD FOR ROBOTIC OBJECT DETECTION USING A CONVOLUTIONAL NEURAL NETWORK

PRIORITY CLAIM

The present application claims the priority benefit of U.S. provisional patent application No. 62/787,588 filed Jan. 2, 2019 and entitled "System and Method for Multi-object Detection with a LIDAR Sensor using a Convolutional Neural Network," the disclosure of which is incorporated herein by reference.

SUMMARY

Embodiments of the invention relate in general to a system and method for robotic object detection using a convolutional neural network. Embodiments of the invention relate in general to a system and method for robotic object detection with a sensor using a convolutional neural network. Embodiments of the invention relate to a system and method for robotic object detection with a two-dimensional (2D) sensor using a convolutional neural network. Other embodiments of the invention relate to a system and method for robotic object detection with a three-dimensional (3D) sensor using a convolutional neural network. More specifically, embodiments of the invention relate to a system and method for robotic object detection with a light detection and ranging (LIDAR) sensor using a convolutional neural network. Further embodiments of the invention relate to a system and method for robotic object detection with a LIDAR sensor using a convolutional neural network of an object in an environment of a robot. For example, the system enables the robot to use the semantic identification to do one or more of make a decision and take an action.

A system includes: a mobile robot, the robot comprising a sensor; and a server operably connected to the robot over a network, the robot being configured to detect an object by processing sensor data using a convolutional neural network.

A system includes: a mobile robot, the robot comprising a two-dimensional (2D) sensor, the 2D sensor configured to provide spatial data about a frontward facing surface of one or more nearby objects, the 2D sensor further configured to provide infrared data related to one or more of a shape, a size, a type, a reflectivity, a location, and dynamic data regarding the object, the robot further comprising a three-dimensional (3D) sensor, the 3D sensor configured to provide spatial data about a frontward facing surface of one or more nearby objects, the 3D sensor further configured to provide infrared data related to one or more of a shape, a size, a type, a reflectivity, a location, and dynamic data regarding the object; and a server operably connected to the robot over a network, the server configured to manage the robot, the server further configured to provide the robot with location data regarding one or more of a location of the robot, a destination of the robot, and a location of the object; the robot being configured to detect an object by processing sensor data using a convolutional neural network, the convolutional neural network being configured to determine one or more of information about a location of the object and information about the object type describing the object, the server being configured to train the convolutional neural network while the server is in an offline status, wherein the training comprises using a plurality of examples of an input to the convolutional neural network and a corresponding desired output from the convolutional neural network, wherein one or more of the 2D sensor and the 3D sensor provides one or more of spatial data and intensity data.

A method for computing a robotic path that is likely to be safe includes: using a system comprising a mobile robot, the robot comprising a sensor, the system further comprising a server operably connected to the robot over a network, the robot being configured to detect an object by processing sensor data using a pipeline, the pipeline comprising a convolutional neural network, the system further comprising a first object, the system further comprising a second object, the pipeline configured to perform a data collection step, determining, by the robot, a plurality of candidate robot paths, the candidate robot paths comprising routes that the robot calculates as being feasible for the robot to traverse depending on the positions of the first object and the second object; scanning, by the robot, a first point on the first object, using the sensor; scanning, by the robot, a second point on the first object, using the sensor; scanning, by the robot, a third point on the first object, using the sensor; scanning, by the robot, a first point on the second object, using the sensor; scanning, by the robot, a second point on a second object, using the sensor; predicting, by the robot, a first object path of the first object; predicting by the robot, that the first object trajectory and the selected candidate robot path indicate a likely safe path for the robot avoiding the first moving obstacle; predicting, by the robot, a second object trajectory of the second object; predicting by the robot, that the second object trajectory and the selected candidate robot path indicate a likely safe path for the robot avoiding the second moving obstacle; designating, by the robot, the likely safe path; and navigating, by the robot, along the designated likely safe path.

A pipeline for robotic object detection with a sensor using a convolutional neural network, includes: a system comprising a mobile robot, the robot comprising a sensor, the system further comprising a server operably connected to the robot over a network, the robot being configured to detect an object by processing sensor data using a pipeline, the pipeline comprising a convolutional neural network, the pipeline configured to perform a data collection step, the pipeline further configured to perform a data transformation step, the pipeline further configured to perform a convolutional neural network step, the pipeline further configured to perform a network output transformation step, the pipeline further configured to perform a results output step.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIGS. 2A-2C are a set of three drawings showing a schematic outline of steps in a detection pipeline and a blowup of two frames in the schematic outline.

FIGS. 3A-3B are a pair of drawings schematically illustrating a transformation into an array of two-dimensional sensor data regarding infrared intensity and location.

FIGS. 4A-4C schematically depict a specific implementation of the system and method for robotic object detection with a sensor using a convolutional neural network.

DETAILED DESCRIPTION

Figure 1A:
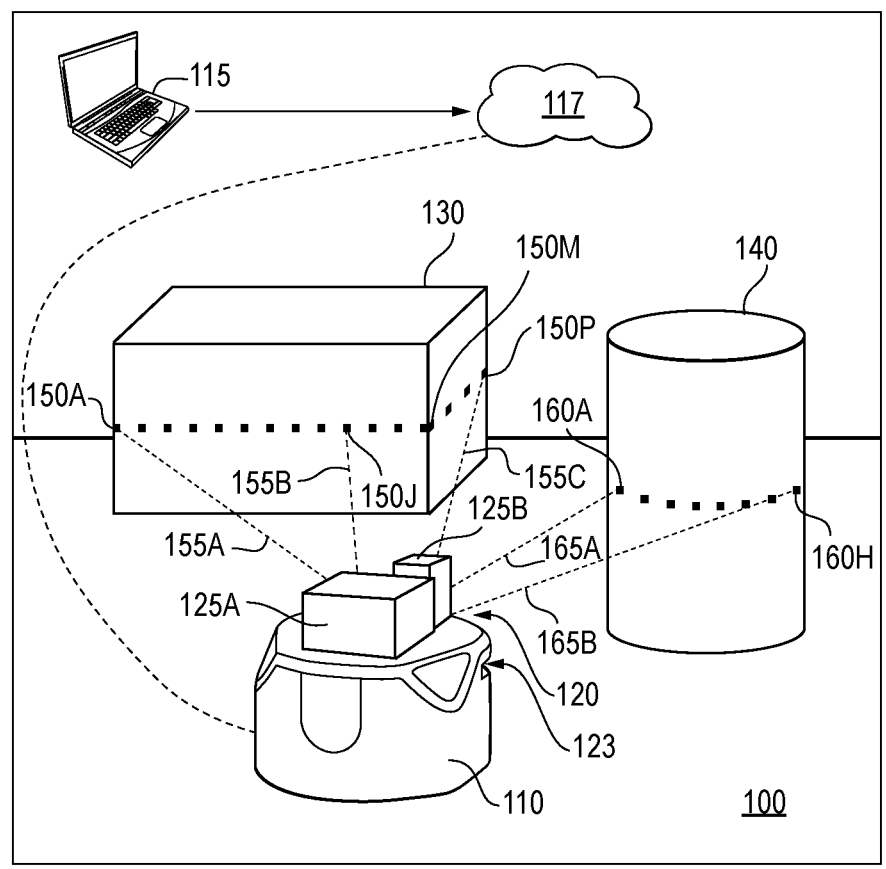
FIG. 1A depicts a front view of a system comprising a mobile robot, the mobile robot comprising a two-dimensional (2D) sensor configured to detect nearby objects, the mobile robot further comprising a three-dimensional (3D) sensor configured to detect nearby objects.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of the invention relate in general to a system and method for robotic object detection with a sensor using a convolutional neural network.

A system for robotic object detection using a convolutional neural network comprises a robot. Preferably, although not necessarily, the system for robotic object detection using a convolutional neural network comprises a mobile robot. For example, the mobile robot is operably connected to a server. Preferably, although not necessarily, the server comprises a fleet management server.

Preferably, although not necessarily, the mobile robot is operably connected to the server through a communication system. Preferably, although not necessarily, the mobile robot is operably connected to the server through a wireless communication system.

For example, the server is one or more of physically located within the facility in which the robot operates, based in the cloud, and resides on the robot. For example, the server comprises a personal computer.

Typically, although not necessarily, the robot communicates with the server using a wireless communication system. For example, the communication system to transmit data from the robot to the server uses one or more of WiFi, Bluetooth, Zigbee, and another wireless communication system.

In this system, point data from a laser sensor is used to populate an input tensor using a projective, lossy transformation, i.e. Cartesian points and intensity data that the system will draw into a multidimensional array representation.

According to embodiments of the invention, using an offline fleet management server, the system trains the convolutional neural network using a plurality of examples of an input to the convolutional neural network and a corresponding desired output from the convolutional neural network. Training, basically meaning tuning using previously generated data to optimize operation of the system, generates a network capable of encoding a generalized relation between similar, yet-to be seen inputs and their corresponding yet-to-be-seen outputs.

A trained convolutional neural network will encode a high-dimensional relationship between 1) typical laser sensor inputs and 2) semantic determinations about the environment observed with the sensor data. Namely, the convolutional neural network will localize and classify information about the robot. That is, the convolutional neural network determines one or more of information about a location of an object of interest and information about the object type describing the object of interest.

According to embodiments of the invention, the system uses a convolutional neural network as a mechanism for localizing and classifying objects.

In this system, one or more of the location and the type of an object is identified from one or more of spatial data and intensity data provided by a sensor mounted on a mobile robot. For example, the object type comprises one or more of a vehicle, a robot, a cart, a landmark, a stationary object, a warehouse, an inventory shelf, and another object type. The data is processed using a pipeline configured for detecting multiple types of objects in a robot's nominal operating environment using combined spatial (shape/size/type/reflectivity/location/dynamic data) and intensity data from one or more of a 2D scanning range sensor and a 3D scanning range sensor. In this pipeline, robotic object detection is performed using data from these sensors that has been processed by a convolutional neural network. According to embodiments of the invention, the pipeline uses one or more of intensity data and spatial point data to help internal mechanisms disambiguate objects. Preferably, although not necessarily, the pipeline uses both intensity data and spatial point data to help internal mechanisms disambiguate objects.

In this system, the location and type of objects (e.g. other vehicles, other robots, carts, landmarks, stationary objects, etc.) is identified from spatial and intensity data, provided by a sensor mounted on a robot. Data from this sensor is transformed using a particular processing pipeline that includes a convolution neural network. A key element to this system is the use sensor data that contains both spatial and infrared data, rather than just spatial data. The utilization of both values provides enough data to allow a convolutional neural network to distinguish multiple types of objects from one another, even in the presence of sensor noise or disturbances.

FIG. 1A depicts a front view of a system 100 comprising a mobile robot 110, the mobile robot 110 comprising a two-dimensional (2D) sensor 120 configured to detect nearby objects, the mobile robot further comprising a three-dimensional (3D) sensor 123 configured to detect nearby objects.

The system further comprises a server 115 that is operably connected to the robot 110. The server 115 is configured to manage the robot 110. More specifically, the server 115 is configured to issue high-level navigation commands for execution by the robot 110. The robot 110 functions autonomously with either limited intervention by the server 110 or intervention by the server 110.

For example, the server 115 is operably connected to the mobile robot 110 over a network 117. For example, the server 110 comprises a fleet management server. The server 110 is configured to provide the robot with location information regarding one or more of a location of the robot, a destination of the robot, and a location of an object external to the robot. For example, the object comprises one or more of another robot, a forklift, a golf cart, an autonomous guided vehicles (AGV), another vehicle, and a shelf.

The mobile robot 110 further comprises a two-dimensional (2D) sensor 120 configured to detect nearby objects. For example, the 2D sensor data comprises one or more of spatial data and intensity data. For example, the 2D sensor data comprises both spatial data and intensity data.

The mobile robot 110 further comprises a three-dimensional (3D) sensor 123 configured to detect nearby objects. For example, the 3D sensor data comprises one or more of spatial data and intensity data. For example, the 3D sensor data comprises both spatial data and intensity data.

As depicted, the mobile robot 110 is currently holding two onboard objects 125A and 125B, the onboard objects 125A and 125B each being onboard the mobile robot 110. For example, the onboard objects 125A and 125B comprise order items 125A and 125B that the mobile robot 110 has picked up pursuant to a previously received order. The mobile robot 110 is configured to process data from one or more of the 2D sensor 120 and the 3D sensor 123 using a convolutional neural network. Preferably, but not necessarily, the mobile robot 110 is configured to process data from one or more of the 2D sensor 120 and the 3D sensor 123 using a convolutional neural network. For example, the mobile robot detects an object by processing data from the 2D sensor 120 using the convolutional neural network. For example, the mobile robot detects an object by processing data from the 3D sensor 123 using the convolutional neural network.

For example, the 2D sensor 120 comprises one or more of a LIDAR sensor, a radio detection and ranging (RADAR) sensor, a sound navigation ranging (SONAR) sensor, and another 2D sensor. For example, the 2D sensor 120 comprises a TIM571 LIDAR sensor, manufactured by Sick of Waldkirch, Germany (www.sick.com). The 2D sensor 120 is configured to detect one or more of a first object 130 and a second object 140 in its environment 100. As depicted, the first object 130 comprises a rectangularly shaped box 130 having a dark color. As depicted, the second object 140 comprises a cylinder 140 having a light color. The darkly colored box 130 and the lightly colored cylinder 140 are representative examples of commonly occurring objects 130, 140 that are likely to appear in the robot's usual operating environment 100.

For example, the 3D sensor 123 comprises a Real Sense camera, manufactured by Intel Corporation of Santa Clara, Calif. (www.intel.com). The 3D sensor 123 is configured to detect one or more of the first object 130 and the second object 140 in its environment 100. As depicted, the first object 130 comprises a rectangularly shaped box 130 having a dark color. As depicted, the second object 140 comprises a cylinder 140 having a light color. The darkly colored box 130 and the lightly colored cylinder 140 are representative examples of commonly occurring objects 130, 140 that are likely to appear in the robot's usual operating environment 100.

Optionally, but not necessarily, one or more of the 2D sensor 120 and the 3D sensor 123 may be further configured to detect one of more of the onboard objects 125A and 125B. In this set of embodiments, one or more of the 2D sensor 120 and the 3D sensor 123 is positioned with a different field of view so that the one or more of the 2D sensor 120 and the 3D sensor 123 can detect the onboard objects 125A and 125B.

For example, the 2D sensor 120 comprises a two-dimensional (2D) scanning laser sensor 120. For example, the 2D sensor 120 is configured to provide spatial data about a frontward facing surface of the one or more nearby objects 130, 140.

For example, the 3D sensor 123 comprises a three-dimensional (3D) scanning laser sensor 123. For example, the 3D sensor 123 is configured to provide spatial data about a frontward facing surface of the one or more nearby objects 130, 140.

One or more of the 2D sensor 120 and the 3D sensor 123 detects data regarding the first object 130 by scanning points 150A-150P on the first object 130. The sensor data comprises one or more of 2D data and 3D data. For example, the sensor data comprises both 2D data and 3D data.

The robot 110 interprets a first laser scan 155A as a sampling of a surface of the object 130, resolved as one or more of 2D points and 3D points.

For example, the 2D sensor 120 scans the point 150A on the first object 130 using the first laser scan 155A. The robot 110 interprets a second laser scan 155B as a sampling of a surface of the object 130, resolved as one or more of 2D points and 3D points. For example, the 2D sensor 120 scans the point 150J on the first object 130 using the second laser scan 155B. For example, the 2D sensor 120 scans the point 150P on the first object 130 using a third laser scan 155C. The robot 110 interprets the third laser scan 155C as a sampling of a surface of the object 130, resolved as one or more of 2D points and 3D points.

One or more of the 2D sensor 120 and the 3D sensor 123 detects data regarding the first object 130 by scanning points 150A-150P on the first object 130. The robot 110 interprets a first laser scan 155A as a sampling of a surface of the object 130, resolved as one or more of 2D points and 3D points.

For example, the 2D sensor 120 detects data regarding the second object 140 by scanning points 160A-160H on the second object 140. For example, the 2D sensor 120 scans the point 160A on the second object 140 using laser scan 165A. For example, the 2D sensor 120 scans the point 160H on the second object 140 using laser scan 165B.

Figure 1B:
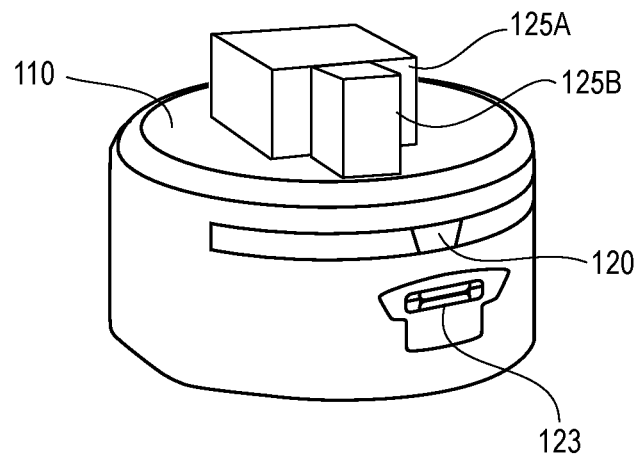
FIG. 1B depicts a rear view of the system comprising the mobile robot, showing the 2D sensor and the 3D sensor.

FIG. 1B depicts a rear view of the system 100 comprising the mobile robot 110, showing the 2D sensor 120 and the 3D sensor 123. Also shown again are the two onboard objects 125A and 125B.

Figure 1C:
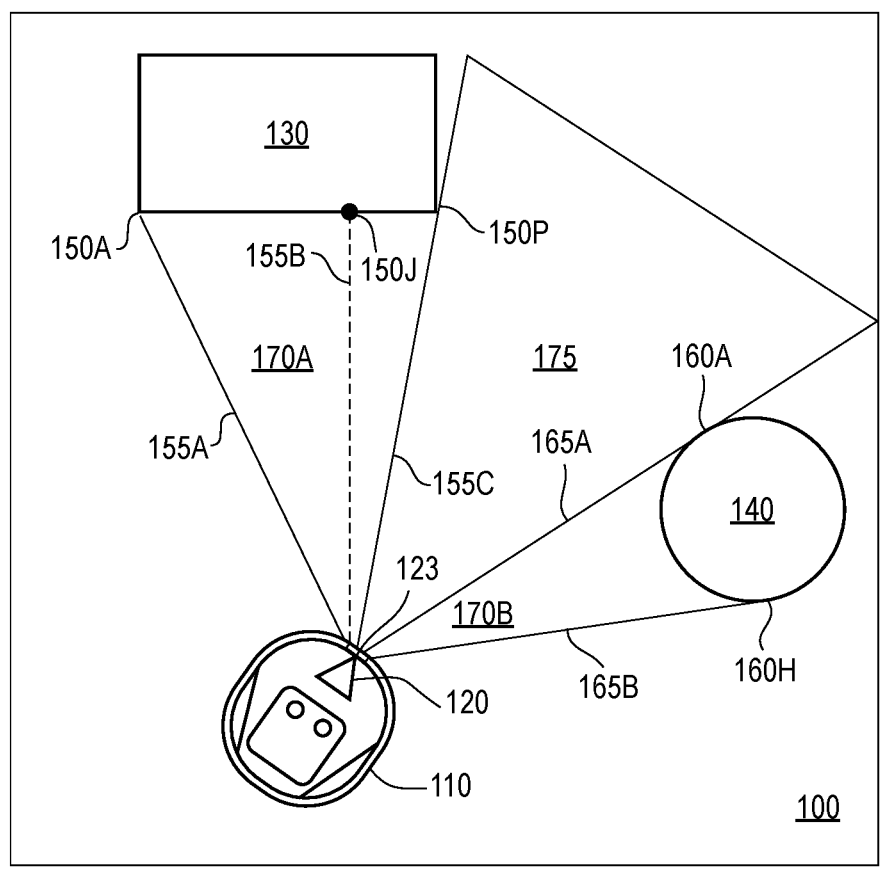
FIG. 1C depicts a top view of the system comprising the mobile robot, the mobile robot using the 2D sensor.

FIG. 1C depicts a top view of the system 100 comprising the mobile robot 110, the mobile robot 110 using the 2D sensor 120. The mobile robot 110 again comprises the 2D sensor 120, the mobile robot again comprising the 3D sensor 123. The 2D sensor 120 is again configured to detect one or more of the first object 130 and the second object 140 in its environment 100. The first object 130 again comprises the rectangularly shaped box 130 having the dark color. The second object 140 again comprises the cylinder 140 having the light color.

The 2D sensor 120 again detects data regarding the first object 130 by scanning 2D points 150A-150P on the first object 130. For example, the 2D sensor 120 scans 2D points along a surface of the first object 130. The 2D sensor 120 again scans the 2D point 150A on the first object 130 using a 2D first object first laser scan 155A. The 2D sensor 120 again scans the point 150J on the first object 130 using a 2D first object second laser scan 155B. The 2D sensor 120 again scans the point 150P on the first object 130 using a 2D first object third laser scan 155C.

The 2D sensor 120 again detects data regarding the second object 140 by scanning points 160A-160H on the second object 140. For example, the 2D sensor 120 samples 2D points along a surface of the second object 140. The 2D sensor 120 again scans the 2D point 160A on the second object 140 using a 2D second object first laser scan 165A. The 2D sensor 120 again scans the 2D point 160H on the second object 140 using a 2D second object second laser scan 165B.

A first detection sector 170A represents an area transected by the first object 130. The first detection sector 170A comprises an area transected by the first object first laser scan 155A and the 2D first object third laser scan 155C.

A second detection sector 170B represents an area transected by the second object 130. The second detection sector 170B comprises an area transected by the second object first laser scan 165A and the 2D second object second laser scan 165B.

As long as the 2D sensor 120 is aimed toward a point lying within one or more of the first detection sector 170A and the second detection sector 1706, the 2D sensor 120 will detect an object 130, 140.

A non-detection sector 175 represents an area that is not transected by the first object 130, the non-detection sector 175 also not transected by the second object 140. The non-detection sector 175 comprises an area transected by the first object third laser scan 155C and the second object first laser scan 165A.

Figure 1D:
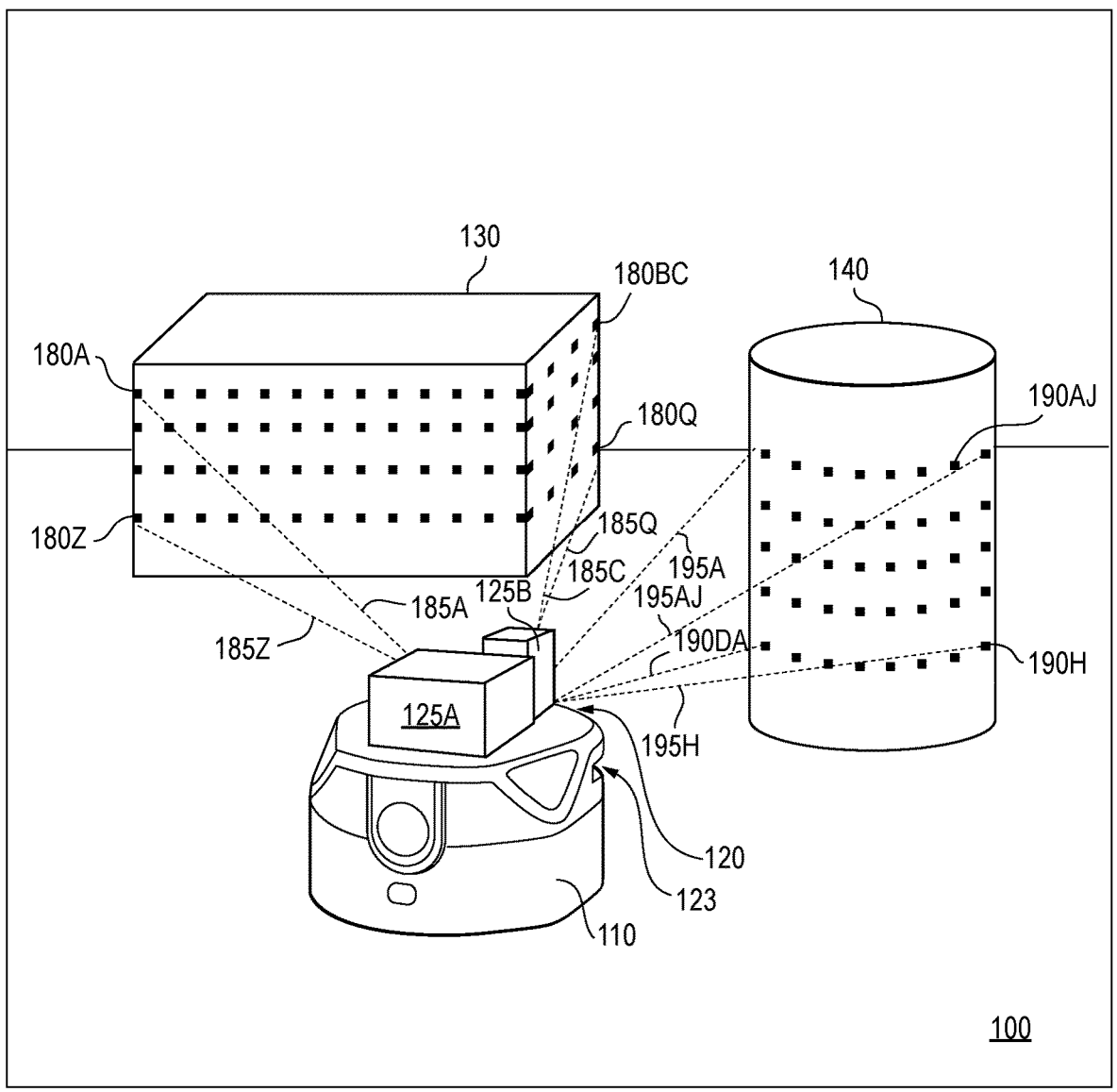
FIG. 1D depicts a front view of the system comprising the mobile robot, the mobile robot using the 3D sensor.

FIG. 1D depicts a front view of a system 100 comprising a mobile robot 110, the mobile robot 110 using the 3D sensor 123. The mobile robot 110 again comprises the 2D sensor 120, the mobile robot again comprising the 3D sensor 123. As depicted, the mobile robot 110 is again currently holding two onboard objects 125A and 125B. For example, the onboard objects 125A and 125B again comprise order items 125A and 1256 that the mobile robot 110 has picked up pursuant to a previously received order.

The 3D sensor 123 is again configured to detect one or more of a first object 130 and a second object 140 in its environment 100. As depicted, the first object 130 again comprises a rectangularly shaped box 130 having a dark color. As depicted, the second object 140 again comprises a cylinder 140 having a light color.

Optionally, but not necessarily, the 3D sensor 123 may be further configured to detect one of more of the onboard objects 125A and 125B.

For example, the 3D sensor 123 comprises a three-dimensional (3D) scanning laser sensor 123. For example, the 3D sensor 123 is configured to provide spatial data about a frontward facing surface of one or more nearby objects 130, 140. For example, the 3D sensor 123 is further configured to provide infrared data regarding one or more of a shape, a size, a type, a reflectivity, a location, and dynamic data regarding the nearby objects 130, 140.

The 3D sensor 123 detects data regarding the first object 130 by scanning 3D points 180A-180BC on the first object 130. For example, the 3D sensor 123 scans a 3D point 180A on the first object 130 using a 3D first object laser scan 185A. For example, the 3D sensor 123 scans a 3D point 180Q on the first object 130 using a 3D first object laser scan 185Q. For example, the 3D sensor 123 scans a 3D point 180Z on the first object 130 using a 3D first object laser scan 185Z. For example, the 3D sensor 123 scans a 3D point 180BC on the first object 130 using a 3D first object laser scan 185BC.

The 3D sensor 123 detects data regarding the second object 140 by scanning 3D points 190A-190DA on the second object 140. For example, the 3D sensor 123 scans a 3D point 190A on the second object 140 using a 3D second object laser scan 195A. For example, the 3D sensor 123 scans a 3D point 190H on the second object 140 using a 3D second object laser scan 195H. For example, the 3D sensor 123 scans a 3D point 190AJ on the second object 140 using a 3D second object laser scan 195AJ. For example, the 3D sensor 123 scans a 3D point 190DA on the second object 140 using a 3D second object laser scan 195DA.

Figure 2B:
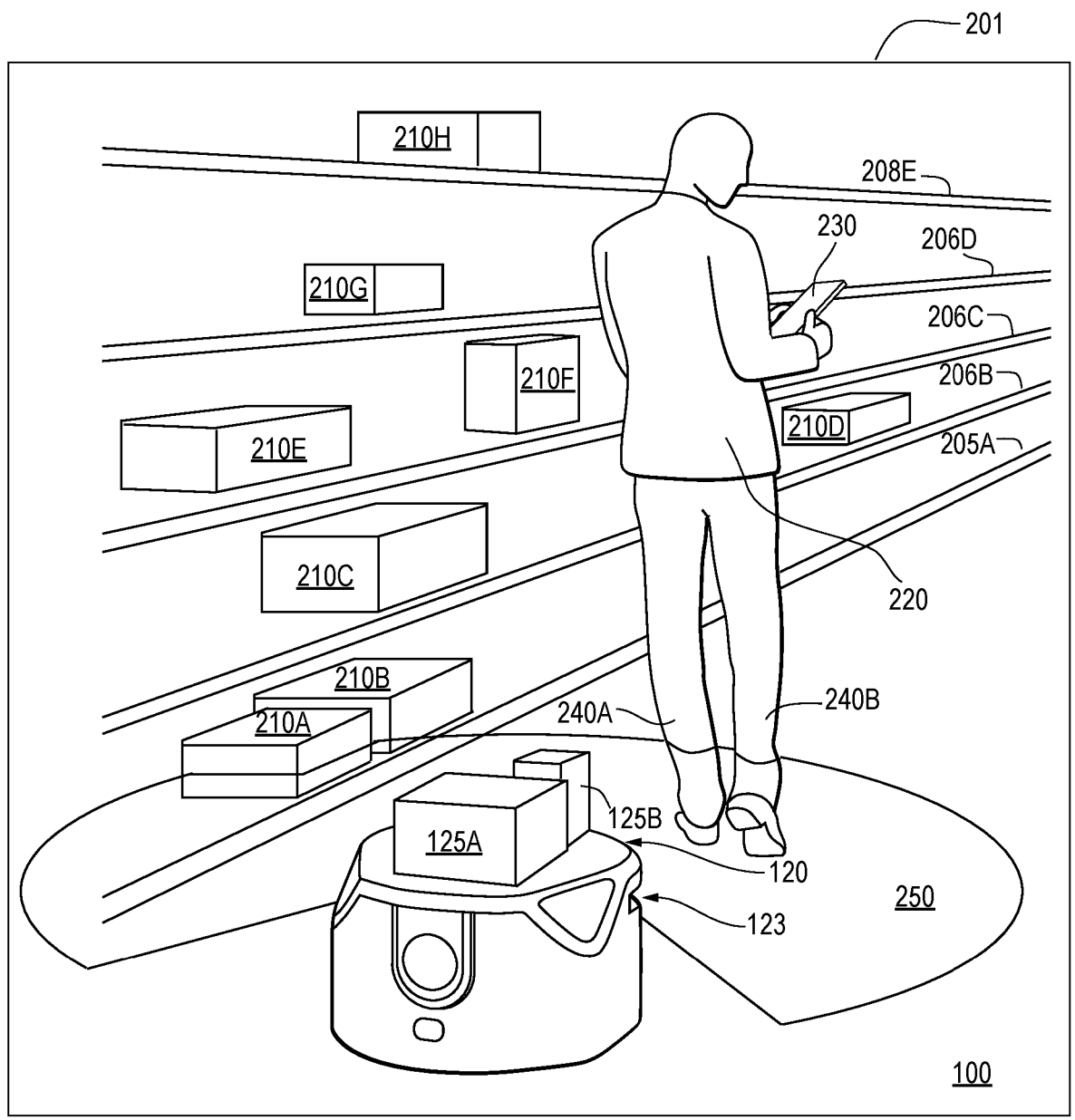
Figure 2C:
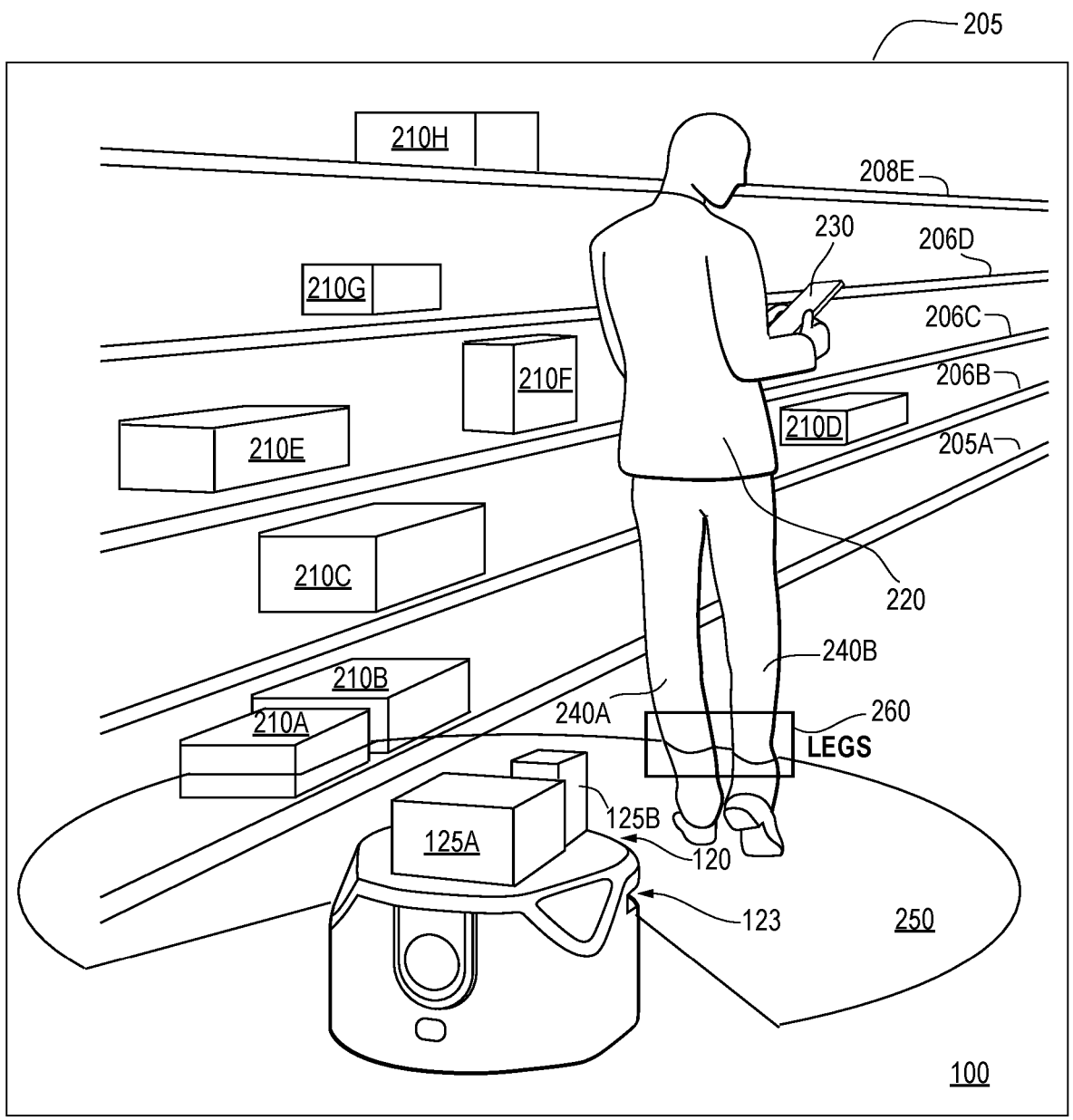

FIGS. 2A-2C are a set of three drawings showing a schematic outline of steps in a detection pipeline and a blowup of two frames in the schematic outline.

FIG. 2A is a schematic outline of steps in a detection pipeline 200 for a system and method for robotic object detection with a sensor 120, 123 using a convolutional neural network. The sensor comprises one or more of the 2D sensor 120 and the 3D sensor 123.

The pipeline 200 comprises five major steps, a data collection step 201, a data transformation step 202, a convolutional neural network step 203, a network output transformation step 204, and a results output step 205.

As depicted in the data collection step 201, the system 100 collects data.

As further depicted in FIG. 2B, which shows the data collection step 201 in greater detail, the system 100 again comprises a robot 110. The robot 110 in turn comprises a 2D sensor 120. The robot further comprises a 3D sensor 123. For example, the robot 110 comprises both a 2D sensor 120 and a 3D sensor 123. For example, the 2D sensor 120 comprises a scanning range sensor 120. The scanning range sensor 120 provides one or more of sparse spatial data and sparse infrared data about the environment 100 within which the robot 110 is operating. For example, the 2D sensor 120 comprises a LIDAR sensor 120. As depicted, the mobile robot 110 is currently holding two onboard objects 125A and 125B.

As further depicted in FIG. 2B, the environment 100 comprises five order shelves 206A-206E, the order shelves 206A-206E in turn comprising order items 210A-210H. The environment 100 further comprises a human 220. The human 220 is carrying an data capture device 230. The 2D sensor 120 is currently depicted detecting the first order item 210A, the second order item 210B, and the human 220. The robot 110 is tracing one or more legs 240A and 240B of the human 220 using a 2D laser sensor 120. A detection sector 250 represents an area 250 that the 2D sensor 120 can detect in its current position. Due to inherent limitations of the 2D sensor 120, the 2D sensor 120 sparsely samples the legs 240A-240B as spatial sensor data.

Without prior knowledge about how a human leg 240A, 240B appears when seen in the detection sector 250 of the 2D sensor 120, the robot 110 cannot accurately determine that the data received corresponds to a leg of a human 220.

As depicted in the data transformation step 202, the system transforms the LIDAR data from raw sensor data to a preferred format that can be processed by a convolutional neural network. For example, the preferred format comprises an array. For example, the preferred format comprises a multidimensional sensor array. For example, the multidimensional sensor array comprises a tensor. This data transformation step 202 is generalizable to different sensor inputs. FIGS. 3A-3B provide more detail on this data transformation step 202.

Figure 4A:
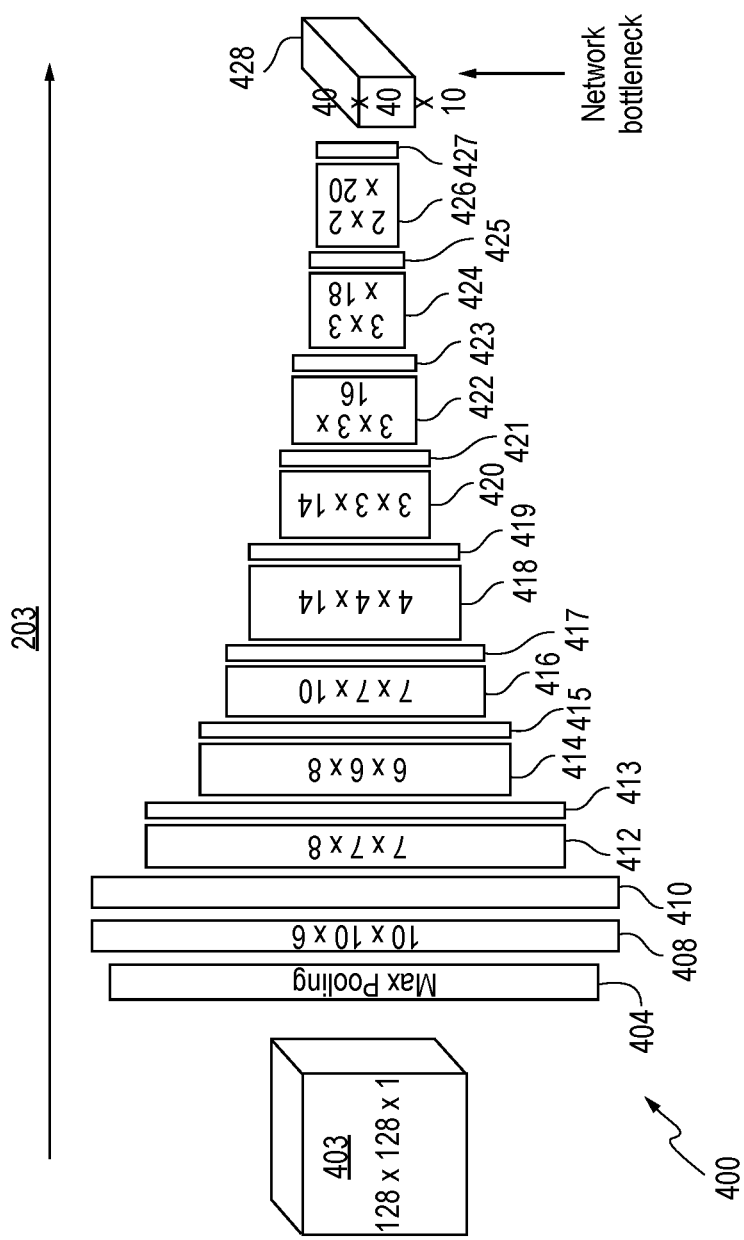

In the convolutional neural network step 203, the system passes the transformed data through a convolutional neural network, which is used to classify objects using the preferred format. FIGS. 4A-4C provides more detail on this convolutional neural network step 203.

Figure 5B:
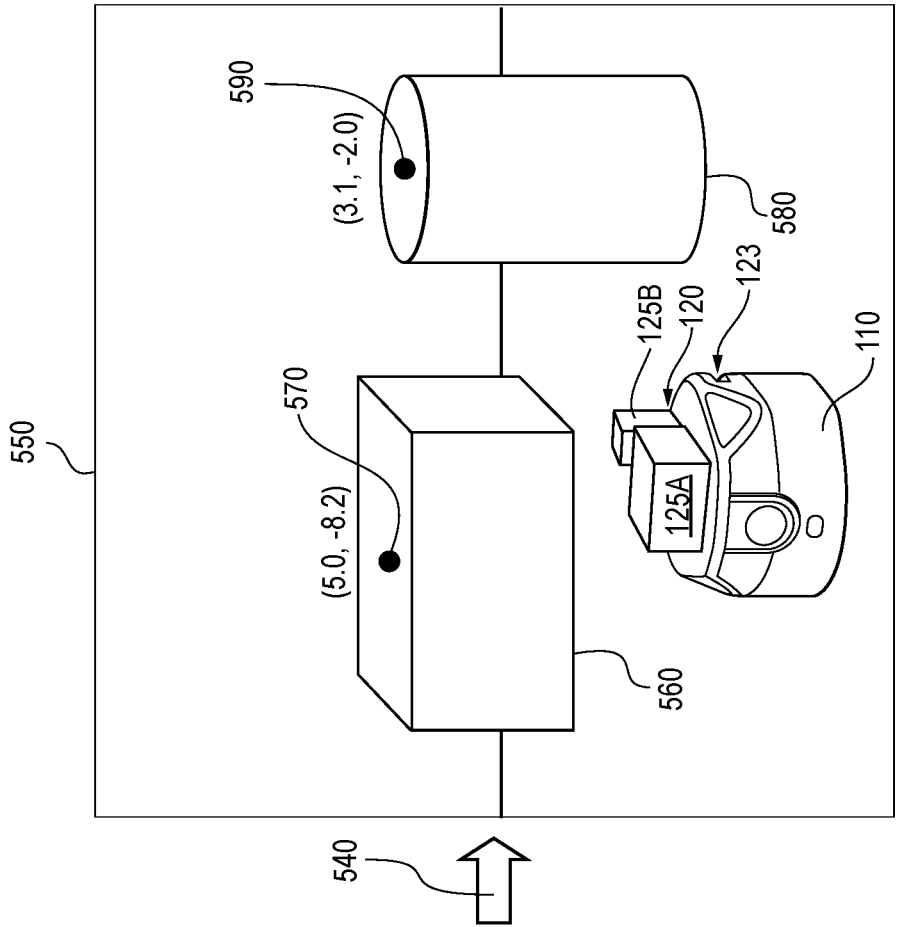
FIGS. 5A-5B are a pair of drawings schematically illustrating a network output transformation step in which cells are grouped and transformed into real world locations.
Figure 5A:
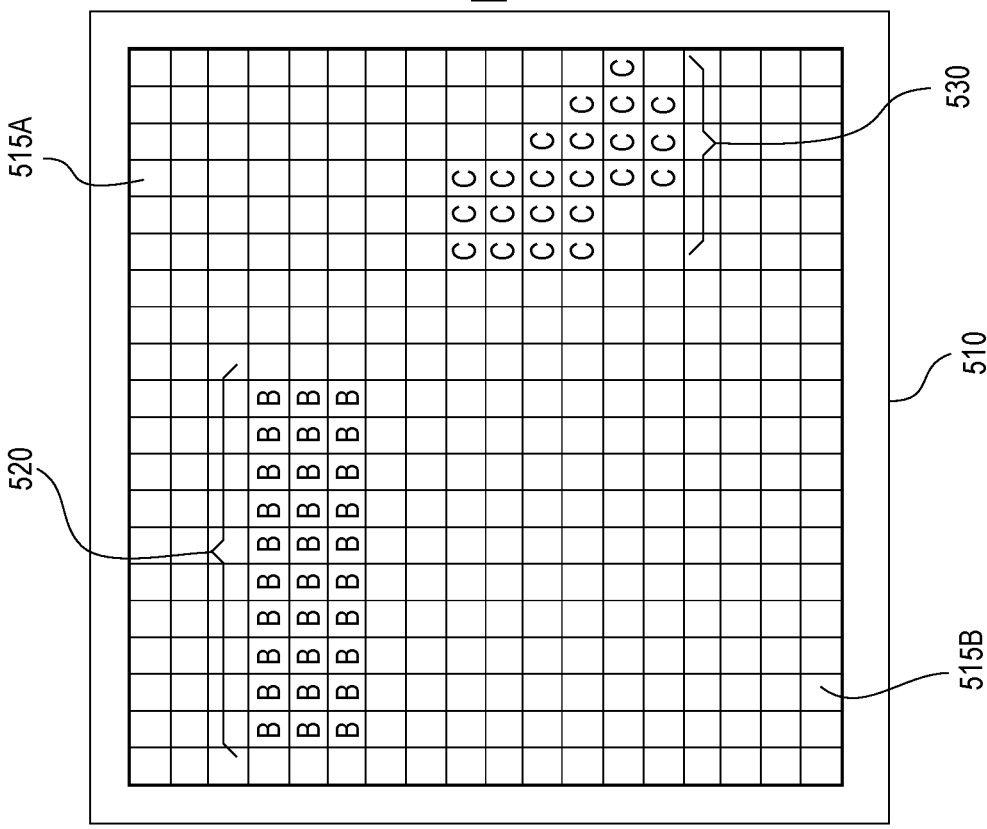

In the network output transformation step 204, the system transforms labeled neural network outputs, generating a representation suitable to use for object tracking. FIGS. 5A-5B provide more detail on this network output transformation step 204.

In the results output step 205, the system 100 outputs a result identifying the object. As depicted, in the results output step 205, the system outputs a result identifying the object as legs. For example, the result comprises a final image. For example, the final image has a size equal to a size of the array.

As also depicted above in the data collection step 201, in the results output step 205, the system 100 again comprises the robot 110. The robot 110 again comprises the 2D sensor 120. The scanning range sensor 120 again provides one or more of sparse spatial data and sparse infrared data about the environment 100 within which the robot 110 is operating. As depicted, the mobile robot 110 is again holding two onboard objects 125A and 125B.

As further depicted in FIG. 2C, which shows the results output step 205 in greater detail, the system 100 again comprises a robot 110. The robot 110 in turn comprises a 2D sensor 120. The robot further comprises a 3D sensor 123. For example, the 2D sensor 120 comprises a 2D sensor 120. For example, the 2D sensor 120 comprises a 3D sensor 123. For example, the robot 110 comprises both a 2D sensor 120 and a 3D sensor 123. For example, the 2D sensor 120 comprises a 2D scanning range sensor 120. The 2D scanning range sensor 120 provides one or more of sparse spatial data and sparse infrared data about the environment 100 within which the robot 110 is operating. For example, the 2D sensor 120 comprises a LIDAR sensor 120. As depicted, the mobile robot 110 is currently holding two onboard objects 125A and 125B.

As further depicted in FIG. 2C, the environment 100 again comprises the five order shelves 206A-206E, the order shelves 206A-206E again in turn comprising the order items 210A-210H. The environment 100 again further comprises the human 220. The human 220 is again carrying the information capture device 230. The 3D sensor 123 is depicted detecting the first order item 210A, the second order item 210B, and the human 220. The robot 110 is tracing one or more legs 240A and 240B of the human 220 using the 3D laser sensor 123. The detection sector 250 represents the area 250 that the 3D sensor 123 can detect in its current position. Due to inherent limitations of the 3D sensor 123, the 3D sensor 123 again sparsely samples the legs 240A-240B as spatial sensor data.

Now having employed the convolutional neural network 203, the robot 110 uses the generated information to correctly identify the human legs 240A, 240B appearing in the detection sector 250 of the 3D sensor 123. The robot correctly identifies the human legs 240A, 240B and identifies the indicated rectangle 260 as comprising two human legs 240A, 240B By using the convolutional neural network, the robot 110 has accurately determined that the data received corresponds to a leg 240A, 240B of the human 220.

The environment 100 again comprises the five order shelves 206A-206E. The order shelves 206A-206E in turn again comprise the order items 210A-210H. The environment 100 again further comprises the human 220. The human 220 is again carrying the information capture device 230. The 3D sensor 123 is depicted detecting the first order item 210A, the second order item 210B, and the human 220. The robot 110 is tracing one or more legs 240A and 240B of the human 220 using the 3D laser sensor 120. The detection sector 250 again represents the area 250 that the 3D sensor 123 can detect in its current position.

In contrast to the data collection step 201, using information gained operating the convolutional neural network 203, the 3D sensor 123 now has knowledge sufficient to identify the legs 240A-240B as legs 240A-240B of a human 220. The detection sector 250 again represents the area detectable by the 3D sensor 123. Given current information, the robot 110 identifies a box 260 as comprising the two legs 240A-240B, now identified by the robot as human legs 240A-240B.

FIGS. 3A-3B are a pair of drawings schematically illustrating a transformation into an array of two-dimensional sensor data regarding infrared intensity and location. FIGS. 3A-3B thus illustrate the data transformation step 202 of the pipeline 200 illustrated in FIG. 2A. Sensor data regarding infrared intensity and location for points lying within a discretization region 310 is shown in FIG. 3A along with the robot 110 comprising the 2D sensor 120, the robot 110 further comprising the 3D sensor 123. The environment 100 again comprises the first object 130 comprising the darkly colored box 130 and the second object 140 comprising the lightly colored cylinder 140, both of which lie within the discretization region 310.

One or more of the 2D sensor 120 and the 3D sensor 123 detects data regarding the first object 130 by scanning points 150A-150K on the first object 130. For example, the 2D sensor 120 scans the point 150A on the first object 130 using laser scan 155A. For example, the 2D sensor 120 scans the point 150K on the first object 130 using laser scan 155B. For example, the 2D sensor 120 scans the point 150P on the first object 130 using laser scan 155C.

One or more of the 2D sensor 120 and the 3D sensor 123 detects data regarding the second object 140 by scanning points 160A-160H on the second object 140. For example, the 3D sensor 123 scans the point 160A on the second object 140 using laser scan 165A. For example, the 3D sensor 123 scans the point 160F on the second object 140 using laser scan 165B. For example, the 3D sensor 123 scans the point 160H on the second object 140 using laser scan 165C.

Also shown is a third object 320 comprising a second lightly colored cylinder 320. One or more of the 2D sensor 120 and the 3D sensor 123 detects data regarding the second lightly colored cylinder 320 by scanning points 325A-325H on the second object 140. For example, the 2D sensor 120 scans the point 325A on the third object 140 using laser scan 330A. For example, the 2D sensor 120 scans the point 325H on the third object 320 using laser scan 330H.

As the second lightly colored cylinder 320 is located outside the discretization region 310, the system does not use point data relating to the second lightly colored cylinder 320 to perform the transformation.

FIG. 3B schematically illustrates a transformation 340, according to embodiments of the invention using the pipeline schematically illustrated in FIG. 2A, of sensor data regarding infrared intensity and location into an array 350. The array 350 comprises a transformed dark shaded box 360 and a transformed light shaded cylinder 370. The array 350 comprises locations in discretized grid space. At least one cell of the array 350, for example, cell 380, comprises an infrared intensity at a corresponding location in discretized grid space. Preferably, each cell of the array 350 comprises an infrared intensity at a corresponding location in discretized grid space.

Using the neural network, the system produces an equivalently sized grid as an output with cell values that correspond to one or more of the dark box and the light cylinder. These cell values will approximately correspond with the corresponding object in the input image. The convolutional neural network output represents object detection data that comprises data regarding both the type of object and location of the objects of interest.

The cells of the input image are shaded with respect to their observed reflectivity as reported by the sensor. The convolutional neural network uses the relative arrangement of these cells, along with the cells' intensity values to determine the type of object in the general vicinity of the original observation.

The pipeline can be tailored to one or more of a shape of an object to be recognized, a size of an object to be recognized, a type of an object to be recognized, a location of an object to be recognized, a reflectivity of an object to be recognized, and dynamic data regarding the object. For example, reflectivity comprises surface reflectivity. The transformation involves a discretization of continuous spatial values into grid cells as follows:

For example, the system performs the transformation on a bounded region of interest. For the bounded region of interest, the system transforms sensor spatial data into indices of a Cartesian grid. For example, a grid index comprises an integer. For example, each grid index comprises an integer. For example, the pipeline discards a detected sensor value that is not comprised in the area covered by the grid.

In this example, the bounded regions of interest comprise the darkly colored box 130 and the lightly colored cylinder 140. For example, the bounded region of interest represents an area of a fixed size surrounding a robot. The system associates an intensity value with at least one Cartesian point. Preferably, the system associates an intensity value with each Cartesian point.

Grid cell values for the grid indices are set with scaled intensity values from the original sensor data. For example, at least one grid index comprises a scaled intensity value from the sensor data. For example, each grid index comprises a scaled intensity value from the sensor data.

FIGS. 4A-4C schematically depict a specific implementation of the system and method for robotic object detection with a sensor using a convolutional neural network. FIGS. 4A-4C thus illustrate the convolutional neural network 203 of the pipeline 200 illustrated in FIG. 2A. The convolutional neural network 203 comprises a convolutional downsampling section 400, a fully-connected neural network section 401, and a generative neural network section 402.

FIG. 4A depicts a convolutional downsampling section 400 of the convolutional neural network 203. FIG. 4A depicts the convolutional downsampling section 400 of the convolutional neural network 203.

The convolutional downsampling section 400 receives an input image 403. For example, the input image 403 comprises an input grayscale image. The convolutional downsampling section 400 comprises a max pooling layer 404, a first downsampling layer 408, a first non-convolutional layer 410, a second downsampling layer 412, a second non-convolutional layer 413, a third downsampling layer 414, a third non-convolutional layer 415, a fourth downsampling layer 416, a fourth non-convolutional layer 417, a fifth downsampling layer 418, a fifth non-convolutional layer 419, a sixth downsampling layer 420, a sixth non-convolutional layer 421, a seventh downsampling layer 422, a seventh non-convolutional layer 423, an eighth downsampling layer 424, an eighth non-convolutional layer 425, a ninth downsampling layer 426, and a ninth non-convolutional layer 427.

In a nutshell, the convolutional downsampling section 400 comprises a first downsampling layer 408, followed by successive non-convolutional layers 410, 414, and so on, alternating with downsampling layers 412, 416, and so on. Each layer is operably connected to both immediately adjacent layers. A successive downsampling layer 412, 416, and so on is operably connected to an immediately preceding non-convolutional layer 410, 414, and so on, the successive downsampling layer also being operably connected to an immediately succeeding non-convolutional layer 412, 416, and so on. Preferably, although not necessarily, each successive downsampling layer 412, 416, and so on is operably connected to the immediately preceding non-convolutional layer 410, 414, and so on, each successive downsampling layer also being operably connected to the immediately succeeding non-convolutional layer 412, 416, and so on.

The convolutional downsampling section 400 generates a downsized volume 428. In this example, a given layer 408, 412, etc. of the convolutional neural network 203 receives an input volume and multiplies it by a convolutional neural network kernel having size A×B×C. In this example, the configurations of the various downsampling layers 408, 412, etc. of the convolutional downsampling section 400 are described using numbers A, B, C, for the dimensions (A×B×C) that respectively refer to a width of a kernel used in the layer, a height of a kernel used in the layer, and a depth of a kernel used in the layer.

The convolutional downsampling section 400 receives the input image 403. The input image 403 has dimensions 128×128×1. The max pooling layer 404 receives the input image 403. The max pooling layer 404 performs non-convolutional operations for purposes of data normalization. For example, the data normalization comprises output value reshaping. The max pooling layer is used both during training and during actual operation of the system. For example, during training of embodiments of the invention, data normalization further comprises randomization. For example, the system performs training using one or more of a fleet management server and a computer.

The max pooling layer 404 selects a maximum value from a sub-region of the input image 403, the sub-region having equal width and height. The max pooling layer forms a new volume using these maximum values, the new volume being smaller than the original volume. For example, the max pooling layer 404 transforms the input image 403 having dimensions 128×128×1 to a volume having dimensions 64×64×1.

The first downsampling layer 408 receives from the max pooling layer 404 an image. The first downsampling layer 408 downsamples the image using a kernel having dimensions 10×10×6. Next the first non-convolutional layer 410 receives the image from the first downsampling layer 408. The first non-convolutional layer 410 performs a non-convolutional operation on the image. For example, the non-convolutional operation comprises one or more of error gradient reshaping and a rectified linear unit ("ReLu") activation function. Error gradient reshaping and biasing are, for simplicity in this application, collectively referred to as "error gradient reshaping." The ReLu activation function remaps values of the convolution in a non-linear way before the data is output from the layer. The ReLu activation function is usable during one or more of training and network operation.

Error gradient reshaping is only used in training the system, not during network operation. Error gradient reshaping comprises one or more of L1, L2, batch normalization, and another method of error gradient reshaping.

The second downsampling layer 412 receives from the first non-convolutional layer 410 an image. The second downsampling layer 412 downsamples the image using a kernel having dimensions 7×7×8. Next the second non-convolutional layer 413 receives the image from the second downsampling layer 412. The second non-convolutional layer 413 again performs a non-convolutional operation on the image. For example, the non-convolutional operation again comprises one or more of the error gradient reshaping and the ReLu activation function. For example, the error gradient reshaping again comprises one or more of L1, L2, batch normalization, and another method of error gradient reshaping.

The third downsampling layer 414 receives from the second non-convolutional layer 413 an image. The third downsampling layer 414 downsamples the image using a kernel having dimensions 6×6×8. Next the third non-convolutional layer 415 receives the image from the third downsampling layer 414. The third non-convolutional layer 415 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The fourth downsampling layer 416 receives from the fourth non-convolutional layer 417 an image. The fourth downsampling layer 416 downsamples the image using a kernel having dimensions 7×7×10. Next the fourth non-convolutional layer 417 receives the image from the fourth downsampling layer 416. The fourth non-convolutional layer 417 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The fifth downsampling layer 418 receives from the fourth non-convolutional layer 417 an image. The fifth downsampling layer 418 downsamples the image using a kernel having dimensions 4×4×14. Next the fifth non-convolutional layer 419 receives the image from the fifth downsampling layer 418. The fifth non-convolutional layer 419 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The sixth downsampling layer 420 receives from the fifth non-convolutional layer 419 an image. The sixth downsampling layer 420 downsamples the image using a kernel having dimensions 3×3×14. Next the sixth non-convolutional layer 421 receives the image from the sixth downsampling layer 420. The sixth non-convolutional layer 421 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The seventh downsampling layer 422 receives from the sixth non-convolutional layer 421 an image. The seventh downsampling layer 422 downsamples the image using a kernel having dimensions 3×3×16. Next the seventh non-convolutional layer 423 receives the image from the seventh downsampling layer 422. The seventh non-convolutional layer 423 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The eighth downsampling layer 424 receives from the seventh non-convolutional layer 423 an image. The eighth downsampling layer 424 downsamples the image using a kernel having dimensions 3×3×18. Next the eighth non-convolutional layer 425 receives the image from the eighth downsampling layer 424. The eighth non-convolutional layer 425 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The ninth downsampling layer 426 receives from the eighth non-convolutional layer 425 an image. The ninth downsampling layer 426 downsamples the image using a kernel having dimensions 2×2×20. Next the ninth non-convolutional layer 427 receives the image from the ninth downsampling layer 426. The ninth non-convolutional layer 427 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The ninth non-convolutional layer 427 outputs a downsized volume 428. The downsized volume 428 has dimensions 40×40×10. The downsized volume 428 comprises a first network bottleneck 428.

In this example, the convolutional downsampling section 400 is used to reduce the input image 403 having dimensions of 128×128×1 to a downsized volume 428 having dimensions of 40×40×10. For example, the input image comprises a gray scale image having dimensions of 128×128. Accordingly, the convolutional downsampling section 400 increases a depth of the input image 403 from an initial value of 1 to a value of 10 for a depth of the downsized volume 428.

As shown in FIG. 4B, the fully-connected neural network section 401 performs object discrimination. The fully-connected neural network section 401 comprises kernels having dimensions of 1×1×D, where D is the kernel depth. Accordingly, in contrast to the convolutional downsampling section 400 and also in contrast to the generative neural network section 402, for the fully-connected neural network section 401, kernel multiplication does not describe a spatial relationship between neighboring cells along the dimensions of width and height.

The fully-connected neural network section 401 maps the 1×1×D sub-volumes into reasonable representations in preparation for the generative neural network section 402 of the convolutional neural network 203. The fully-connected neural network section 401 can be viewed as the "discriminative" part of the convolutional neural network 203 in that the mappings the fully-connected neural section 401 performs effectively estimate a confidence regarding presence of a type of object at a given location. For example, the mappings performed by the fully-connected neural network section 401 estimate a confidence that a robot is present at a given location.

The fully-connected neural network section 401 multiplies a kernel element by element by a sub-volume of the input having dimensions of 1×1×D. The fully-connected neural network section 401 receives from the ninth non-convolutional layer 427 the downsized volume 428. The fully-connected neural network section comprises a first object discrimination layer 429, a first fully-connected non-convolutional layer 430, a second object discrimination layer 431, a second fully-connected non-convolutional layer 432, and a third object discrimination layer 433. The first object discrimination layer 429 receives from the ninth non-convolutional layer 427 the downsized volume 428. The third object discrimination layer 433 outputs the fully-connected image 434 to the generative neural network section 402.

FIG. 4C depicts the generative neural network section 402 of the convolutional neural network 203. As shown in FIG. 4C, this portion of the network generates in the output an identification of a robot.

The generative neural network section 402 comprises a first upsampling layer 436 operably connected to the fully-connected image 434, a tenth non-convolutional layer 438 operably connected to the first upsampling layer 436, a second upsampling layer 440 operably connected to the tenth non-convolutional layer 438, an eleventh non-convolutional layer 442 operably connected to the second upsampling layer 440, a third upsampling layer 444 operably connected to the eleventh non-convolutional layer 442, a twelfth non-convolutional layer 446 operably connected to the third upsampling layer 444, a fourth upsampling layer 448 operably connected to the twelfth non-convolutional layer 446, a thirteenth non-convolutional layer 450 operably connected to the fourth upsampling layer 448, a fifth upsampling layer 452 operably connected to the thirteenth non-convolutional layer 450, a fourteenth non-convolutional layer 454 operably connected to the fifth upsampling layer 452, a sixth upsampling layer 456 operably connected to the fourteenth non-convolutional layer 454, a fifteenth non-convolutional layer 458 operably connected to the sixth upsampling layer 456, a seventh upsampling layer 460 operably connected to the fifteenth non-convolutional layer 458, a sixteenth non-convolutional layer 462 operably connected to the seventh upsampling layer 460, an eighth upsampling layer 464 operably connected to the sixteenth non-convolutional layer 462, a seventeenth non-convolutional layer 466 operably connected to the eighth upsampling layer 464, a ninth upsampling layer 468 operably connected to the seventeenth non-convolutional layer 466, an eighteenth non-convolutional layer 470 operably connected to the ninth upsampling layer 468, and a linear interpolation layer 476 operably connected to the ninth upsampling layer.

In a nutshell, the generative neural network section 402 comprises a first upsampling layer 436, followed by successive non-convolutional layers 438, 442, and so on, alternating with upsampling layers 440, 444, and so on. Each layer is operably connected to both immediately adjacent layers. A successive upsampling layer 440, 444, and so on is operably connected to an immediately preceding non-convolutional layer 438, 442, and so on, the successive upsampling layer also being operably connected to an immediately succeeding non-convolutional layer 440, 444, and so on. Preferably, although not necessarily, each successive upsampling layer 440, 444, and so on is operably connected to the immediately preceding non-convolutional layer 438, 442, and so on, each successive upsampling layer also being operably connected to the immediately succeeding non-convolutional layer 440, 444, and so on. The linear interpolation layer 476 is operably connected to the final non-convolutional layer 438, 442, and so on.

The number of upsampling layers 436, 438, and so on is not necessarily equal to, and in fact does not necessarily have any relationship with, a number of downsampling layers 408, 412, and so on even though for simplicity and depending on context, we use the number n to denote the respective numbers of upsampling layers 436, 438 and so on and the respective number of downsampling layers 408 412, and so on.

Similarly, the number of non-convolutional layers 410, 413, and so on comprised in the convolutional downsampling section 400 of the convolutional neural network 203 is not necessarily equal to, and does not necessarily have any relationship with, a number of non-convolutional layers 438, 442 and so on comprised in the generative neural network section 402. This is again true even though for simplicity and depending on context, we use the number n to denote the respective numbers of non-convolutional layers 410, 413, and so on comprised in the convolutional downsampling section 400 and the respective number of non-convolutional layers 438, 442 and so on comprised in the generative neural network section 402.

In this example, the configurations of the various upsampling layers 436, 440, etc. of the generative neural network section 402 are described using numbers A, B, C, for the dimensions (A×B×C) that respectively refer to a width of a kernel used in the layer, a height of a kernel used in the layer, and a depth of a kernel used in the layer. A given layer receives an input volume and multiplies it by a convolutional neural network kernel having size A×B×C.

The generative neural network section 402 is used to increase the fully-connected image 434 having dimensions of 40×40×10 to an outgoing final image 490 having dimensions of 128×128×1.

The width of the final image 490 is equal to the width of the input image 403. The height of the final image 490 is equal to the height of the input image 403. For example, the final image comprises one or more of spatial data and intensity data regarding the object. For example, the final image comprises both spatial data and intensity data regarding the object. Accordingly, the generative neural network section 402 decreases a depth of the fully-connected image 434 from an initial value of 10 to a value of 1 for a depth of the final image 490.

The generative neural network section 402 receives the fully-connected image 434. The input fully-connected image 434 has dimensions 40×40×10.

The first upsampling layer 436 receives from the third object discrimination layer 433, the fully-connected image 434 having dimensions 40×40×10. Next the tenth non-convolutional layer 438 receives the image from the first upsampling layer 436. The tenth non-convolutional layer 438 performs one or more of error gradient reshaping and the ReLu activation function. The ReLu activation function again remaps values of the convolution in a non-linear way before the data is output from the layer. The ReLu activation function is again usable during one or more of training and network operation.

Methods for error gradient reshaping are again only used in training the system, not during network operation. Error gradient reshaping again comprises one or more of L1 L2, batch normalization, and another method of error gradient reshaping.

The second upsampling layer 440 receives from the tenth non-convolutional layer 438 an image. The second upsampling layer 440 upsamples the image using a kernel having dimensions 3×3×18. Next the eleventh non-convolutional layer 442 receives the image from the second upsampling layer 440. The eleventh non-convolutional layer 442 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The third upsampling layer 444 receives from the eleventh non-convolutional layer 442 an image. The third upsampling layer 444 upsamples the image using a kernel having dimensions 3×3×16. Next the twelfth non-convolutional layer 446 receives the image from the third upsampling layer 444. The twelfth non-convolutional layer 446 again performs a non-convolutional operation on the image. For example, the non-convolutional operation again comprises one or more of the error gradient reshaping and the ReLu activation function. The error gradient reshaping again comprises one or more of L1, L2 batch normalization, and another method of error gradient reshaping.

The fourth upsampling layer 448 receives from the twelfth non-convolutional layer 446 an image. The fourth upsampling layer 448 upsamples the image using a kernel having dimensions 3×3×14. Next the thirteenth non-convolutional layer 450 receives the image from the fourth upsampling layer 448. The thirteenth non-convolutional layer 450 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The fifth upsampling layer 452 receives from the thirteenth non-convolutional layer 450 an image. The fifth upsampling layer 452 upsamples the image using a kernel having dimensions 4×4×14. Next the fourteenth non-convolutional layer 454 receives the image from the fifth upsampling layer 452. The fourteenth non-convolutional layer 454 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The sixth upsampling layer 456 receives from the fourteenth non-convolutional layer 454 an image. The sixth upsampling layer 456 upsamples the image using a kernel having dimensions 7×7×10. Next the fifteenth non-convolutional layer 458 receives the image from the sixth upsampling layer 456. The fifteenth non-convolutional layer 458 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The seventh upsampling layer 460 receives from the fifteenth non-convolutional layer 458 an image. The seventh upsampling layer 460 upsamples the image using a kernel having dimensions 6×6×8. Next the sixteenth non-convolutional layer 462 receives the image from the seventh upsampling layer 460. The sixteenth non-convolutional layer 462 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The eighth upsampling layer 464 receives from the sixteenth non-convolutional layer 462 an image. The eighth upsampling layer 464 upsamples the image using a kernel having dimensions 7×7×8. Next the seventeenth non-convolutional layer 466 receives the image from the eighth upsampling layer 464. The seventeenth non-convolutional layer 466 again performs a non-convolutional operation on the image. For example, the non-convolutional operation again comprises one or more of the error gradient reshaping and the ReLu activation function. The error gradient reshaping again comprises one or more of L1, L2, batch normalization, and another method of error gradient reshaping.

The ninth upsampling layer 468 receives from the seventeenth non-convolutional layer 466 an image. The ninth upsampling layer 468 upsamples the image using a kernel having dimensions 10×10×6. Next the eighteenth non-convolutional layer 470 receives the image from the ninth upsampling layer 468. The eighteenth non-convolutional layer 470 again performs a non-convolutional operation on the image. For example, the image now has dimensions of 64×64×1. For example, the non-convolutional operation again comprises one or more of the error gradient reshaping and the ReLu activation function. The error gradient reshaping again comprises one or more of L1, L2, batch normalization, and another method of error gradient reshaping.

The linear interpolation layer 476 receives the image from the eighteenth non-convolutional layer 470. The linear interpolation layer 476 is configured to perform an operation of linear interpolation that increases the width and height of the image. For example, the linear interpolation layer 476 is configured to perform an operation of linear interpolation that increases the width of the image by a factor of 2, the operation of linear interpolation also increasing the height of the image by a factor of 2, transforming data having dimensions of 64×64×1 to data having dimensions of 128×128×1. The linear interpolation layer 476 linearly interpolates values intermediate between neighboring cell values in a 2×2 neighborhood input volume.

The linear interpolation layer 476 outputs a final image 490. The final image 490 has dimensions 128×128×1.

FIGS. 5A-5B are a pair of drawings schematically illustrating a transformation, according to embodiments of the invention in which cells are grouped and transformed into real world locations.

In FIG. 5A, the grid 510 comprises cells 515A, 515B. The grid 510 further comprises a first cell group 520 corresponding to the darkly colored box 130 shown in FIG. 1A. The grid 510 further comprises a second cell group 530 corresponding to the lightly colored cylinder 140 shown in FIG. 1A.

The system feeds the data, now in the form of the multidimensional array 510, to a convolutional neural network 203 as shown in the convolutional neural network step 203 of FIG. 2A.

The system processes the array using convolution, as schematically indicated by the transformation arrow 540. The convolutional neural network trained to detect specific object types then forward-propagates the resultant values through the network. This data-clustering output transformation is an example of the final data transformation step in the pipeline as shown in the network output transformation step 204 of FIG. 2A.

The relative proximity and values at each cell will affect the final output 550 of the convolutional neural network. Roughly speaking, the convolutional neural network will use the relative arrangement of these cells, along with their cell (intensity) value to determine the type of object in the general vicinity of where they were originally observed.

FIG. 5B depicts output 550 comprising a darkly colored box 560. The darkly colored box 560 comprises a point 570 having Cartesian coordinates (5.0, −8.2). The output 550 further comprises a lightly colored cylinder 580. The lightly colored cylinder 580 comprises a point 590 having Cartesian coordinates (3.1, 2.0). The output 550 further comprises the robot 110. The robot 110 again comprises the onboard objects 125A and 125B.

According to embodiments of the invention, the system can be used to perform one or more or the following:

Detecting and tracking human workers walking around a robot. For example, the pipeline can be used to detect human legs, given data about average leg shapes and infrared returns associated with various pant materials. Tracked detections can be used to determine one or more of a safe following distance and a safe stopping position when navigating around humans.

Detecting and tracking other robots or other dynamic objects with a fixed shape for the purpose of high-fidelity object tracking.

Detecting markers in the environment with distinct shapes and infrared patterns. These markers could represent docking locations; loading and unloading locations; safety zones, and the like. For example, for a given marker, the robot does one or more of perform according to a particular set of rules and take a particular action.

Figure 6:
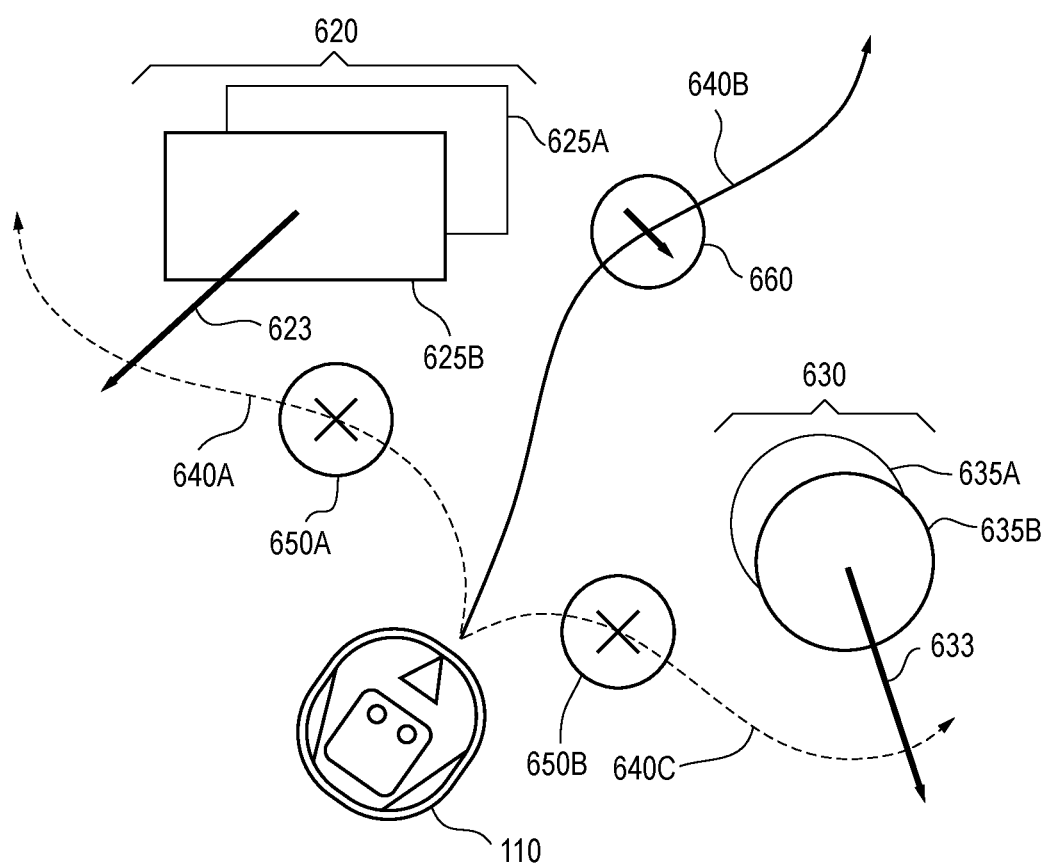
FIG. 6 depicts a system showing a real-world application of the invention, the system comprising a robot using object trajectories to deduce a safe navigation path.

FIG. 6 depicts a system 600 showing a real-world application of the invention, the system comprising a robot 110 using object trajectories to deduce a safe navigation path.

The system 600 further comprises a first moving obstacle 620 that is moving in a first moving obstacle direction 623. The motion of the first moving obstacle 620 is schematically suggested by two successive illustrated positions 625A, 625B of the first moving obstacle 620 as it moves in the first moving obstacle direction 623.

The system further comprises a second moving obstacle 630 that is moving in a second moving obstacle direction 633. The motion of the second moving obstacle 630 is schematically suggested by two successive illustrated positions 635A, 635B of the second moving obstacle 630 as it moves in the second moving obstacle direction 633. Using embodiments of the invention, the robot 110 determines three candidate robot paths 640A, 640B, and 640C. The candidate paths 640A, 640B, and 640C are paths that the robot 110 calculates as being feasible for the robot 110 to traverse depending on the positions of the moving obstacles 620 and 630.

Using embodiments of the invention, the robot 110 determines that a first candidate path 640A is likely to collide with the first moving obstacle 620. The robot 110 responds by marking the first candidate path 640A with a first path non-viability marking 650A. As schematically depicted, the first path non-viability marking 650A comprises a first cross 650A.

Using embodiments of the invention, the robot 110 determines that the second candidate path 640B is likely to be safe. That is, the robot 110 determines that the second candidate path 640B is likely to avoid the first moving obstacle 620, and the robot 110 further determines that the second candidate path 640B is likely to avoid the second moving obstacle 630. The robot 110 responds by marking the second candidate path 640B with a path viability marking 660. As schematically depicted, the path viability marking 660 comprises an arrow 660.

Using embodiments of the invention, the robot 110 further determines that a third candidate path 640C is likely to collide with the second moving obstacle 630. The robot 110 responds by marking the third candidate path 640C with a third path non-viability marking 650B. As schematically depicted, the third path non-viability marking 650B comprises a second cross 650B.

Figure 7:
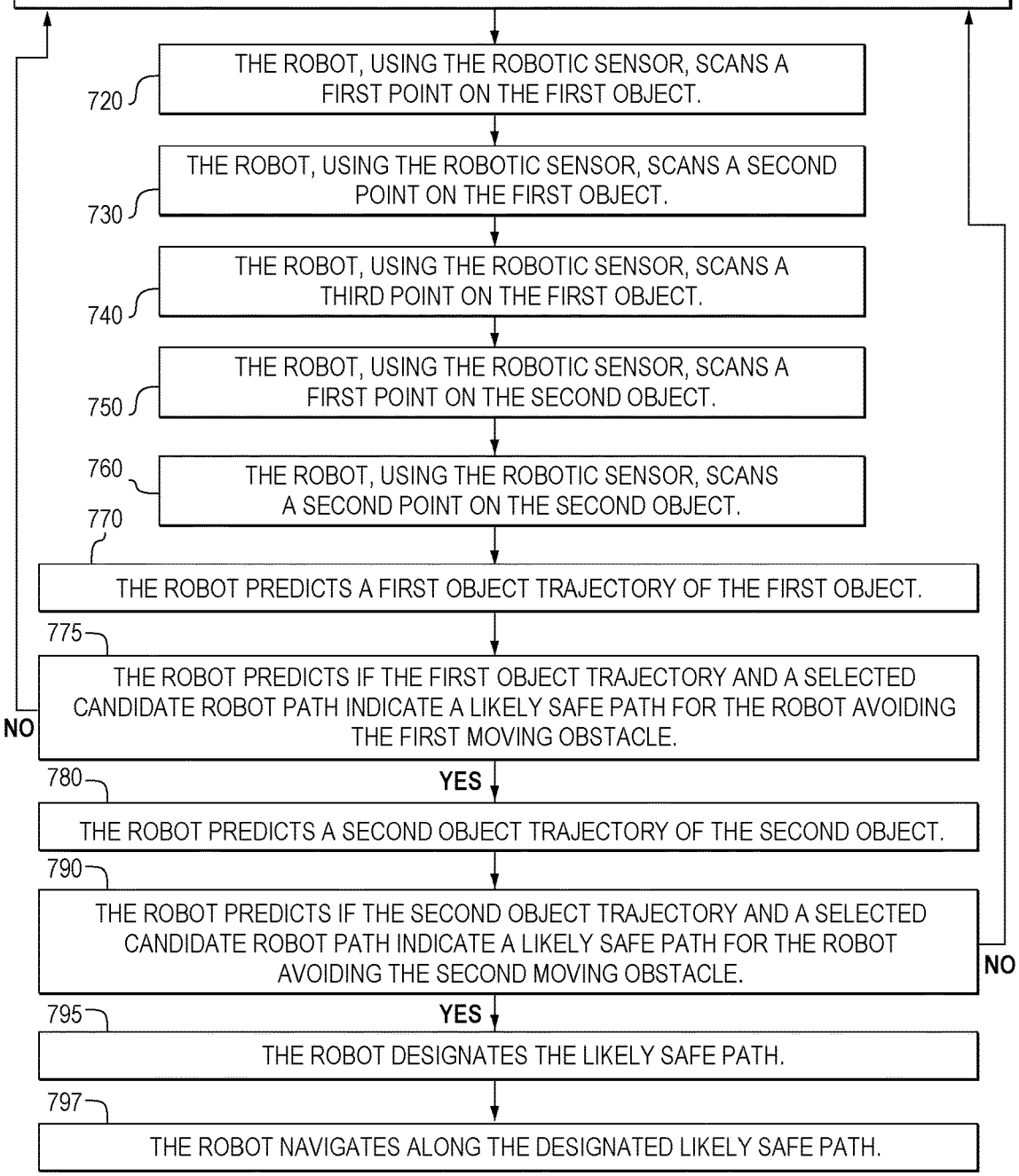
FIG. 7 is a flow chart of a method for computing a robotic path that is likely to be safe.

FIG. 7 is a flow chart of a method 700 for computing a robotic path that is likely to be safe.

The order of the steps in the method 700 is not constrained to that shown in FIG. 7 or described in the following discussion. Several of the steps could occur in a different order without affecting the final result.

In step 710, using a system comprising a mobile robot, the robot comprising a sensor, the system further comprising a server operably connected to the robot over a network, the robot being configured to detect an object by processing sensor data using a pipeline, the pipeline comprising a convolutional neural network, the system further comprising a first object, the system further comprising a second object, the pipeline configured to perform a data collection step, the robot determines a plurality of candidate robot paths, the candidate robot paths comprising routes that the robot calculates as being feasible for the robot to traverse depending on the positions of the first object and the second object. For example, one or more of the first object and the second object is moving. Block 710 then transfers control to block 720.

In step 720, the robot, using the robotic sensor, scans a first point on the first object. Block 720 then transfers control to block 730.

In step 730, the robot, using the robotic sensor, scans a second point on the first object. Block 730 then transfers control to block 740.

In step 740, the robot, using the robotic sensor, scans a third point on the first object. Block 740 then transfers control to block 750.

In step 750, the robot, using the robotic sensor, scans a first point on the second object. Block 750 then transfers control to block 760.

In step 760, the robot, using the robotic sensor, scans a second point on the second object. Block 760 then transfers control to block 770.

In step 770, the robot predicts a first object trajectory of the first object. Block 770 then transfers control to block 775.

In step 775, the robot predicts if the first object trajectory and a selected candidate robot path indicate a likely safe path for the robot avoiding the first moving obstacle. If yes, block 775 transfers control to block 780. If not, block 775 then transfers control to block 710.

In step 780, the robot predicts a second object trajectory of the second object. Block 780 then transfers control to block 790.

In step 790, the robot predicts if the second object trajectory and a selected candidate robot path indicate a likely safe path for the robot avoiding the second moving obstacle. If yes, block 790 transfers control to block 795. If not, block 790 then transfers control to block 710.

In step 795, the robot designates the likely safe path. Block 795 then transfers control to block 797.

In step 797, the robot navigates along the designated likely safe path. Block 797 then terminates the process.

The method further comprises an optional step, performed after the designating step, of deducing, using the likely safe path computations, an optimum safe navigation path for the robot.

The method further comprises an optional additional step, performed after the deducing step, of following, by the robot, the optimum likely safe path.

An advantage of embodiments of the invention is that it overcomes prior art requirements that complex classification algorithms be collectively applied in order to robustly detect multiple types of objects. Each classifier would require its own independent training and fusion of their outputs was a significant barrier to achieving desired results. All of these problems are avoided by embodiments of the invention.

Advantages of embodiments of the invention include transforming laser scan data into an image into a more compact form usable for processing and usable to accurately predict robot locations. A further advantage of embodiments of the invention is that the number of detector stages will always be 1. Another advantage offered by embodiments of the invention is that the detector is trained to detect different object types. A further advantage of embodiments of the invention is that sensor inputs are combined before passing through the detector. Another advantage of embodiments of the invention is that detection complexity remains fixed regardless of the number of different types of objects to be detected.

Another advantage of embodiments of the invention is that the mappings the fully-connected neural section performs effectively estimate a confidence about a type of object that is present at a given location. More specifically, the mappings performed by the fully-connected neural network section estimate a confidence in how likely a robot is to be present at a given location.

Another advantage of embodiments of the invention is that limitations are overcome that previously rendered it difficult to obtain detailed data about one or more of object type and object location due to use of scanning range sensors that provide semi-sparse spatial and infrared light data. Another advantage of embodiments of the invention is their ability to provide data about inherent semantic relationships between objects in view, for example, which points lie along a surface of one object rather than another object.

Another advantage of embodiments of the invention is that they overcome previous difficulties fusing spatial and infrared data to make determinations regarding objects. Still another advantage of embodiments of the invention is making it possible to determine fixed relationships between local object shape and reflective intensity for a given type of objects, which are generally not transferable to a different type of objects.

Yet another advantage of embodiments of the invention is enabling higher-dimensional relationships to be determined regarding objects in view than can be done using a two-dimensional sensor.

Still another advantage of embodiments of the invention is that detecting and tracking other robots or other dynamic objects with a fixed shape can help avoid a collision while the robot does one or more of operate at a speed that is higher than usual and operates in a cluttered multi-robot workspace.

Another advantage of embodiments of the invention is that the max pooling layer helps maintain a high quality of convolutional neural network generalization, A second advantage provided by use of the max pooling layer is that max pooling is a faster operation than downsampling via convolution. A third advantage provided by use of the max pooling layer is that complexity of subsequent layers is thereby reduced by reducing input/output data sizes.

A still additional advantage of embodiments of the invention is that normalizing the error gradient during training helps promote convergence of the results during training to desirable internal kernel values. A further advantage of embodiments of the invention is that normalizing the error gradient during training helps keep kernel values smaller, thereby resulting in smaller convolution results, thereby potentially helping to prevent saturation of activation functions.

A further advantage of embodiments of the invention is that the ReLu activation function is efficient to compute. Another advantage of embodiments of the invention is that the non-linear ReLu activation function is a more powerful method for generating high-dimensional data encodings than is linear regression.

Yet further advantages of embodiments of the invention include that the pipeline is agnostic to a specific internal architecture of the neural network. For example, the pipeline functions effectively according to embodiments of the invention regardless of the neural network's internal configuration of layers and connections. The pipeline functions irrespective of one or more of a shape of an object to be recognized, a size of an object to be recognized, a type of an object to be recognized, a location of an object to be recognized, a reflectivity of an object to be recognized, and dynamic data regarding the object to be recognized.

A still further advantage of embodiments of the invention is providing a means for mobile robots navigating in highly dynamic environments to leverage one or more of object detection and determination of object properties, thereby enabling the robot to apply prior information about an object, such as one or more of a predicted path and a predicted velocity.

A further advantage of embodiments of the invention is that it allows a robot to deduce an identity of an object, allowing a robot to avoid danger and otherwise improving fidelity of object tracking. A yet additional advantage of embodiments of the invention is that a result is safer navigation, as the robot will know where to move such that it will avoid the object's trajectory.

A yet additional advantage of embodiments of the invention is they help compensate for shortcomings of line of sight sensors by determining inherent semantic relationships between objects in view.

A still further advantage of embodiments of the invention is facilitating the integration of range (spatial) and infrared data to make determinations about an object including relationships between local object shape and reflective intensity, and also including one or more of a shape, a size, a type, a reflectivity, a location, and dynamic data regarding the object.

A further advantage of embodiments of the invention is that they can be used to generate high-level informational encoding from sparse, low-level data.

A still further advantage of embodiments of the invention is providing a capability to track objects so that their motion can be predicted. For example, motion can be thereby predicted of a mobile robot navigating in a highly dynamic environment.

A yet additional advantage of embodiments of the invention is providing a system to generate knowledge regarding properties of outside objects such as, for example, one or more of a human worker and a forklift. For example, the knowledge can then be used to generate a navigation plan for the robot that will avoid the outside objects.

Another advantage of embodiments of the invention is that they are usable to train a robot to do one or more of filter sensor data and encode sensor data into semantic information usable for automatically identifying one or more types of outside objects.

A further advantage of embodiments of the invention is that after being trained with enough input-output examples, a network can encode a generalized relation between similar, yet-to-be seen inputs and their corresponding outputs.

A still additional advantage of embodiments of the invention is that they allow a robot system to react to other robots in the environment without the need for a centralized system providing information about the location of the other robots.

A further advantage of embodiments of the invention is that the linear interpolation layer is usable to fill in unknown data values falling between known data values in the spatially upsampled output input volume.

Another advantage of embodiments of the invention is that the output value reshaping performed as part of data normalization can prevent value saturation in non-linear functions used to remap values after multiplication using kernels.

A still other advantage of embodiments of the invention is that randomization performed during training as part of data normalization can prevent over-fitting of data.

The system and method for robotic object detection using a convolutional neural network includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

For example, it will be understood by those skilled in the art that software used by the system and method for robotic object detection using a convolutional neural network may be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

For example, embodiments of the invention could operate on a wide range of devices other than mobile phones, tablets, and computers without substantially affecting the functioning of embodiments of the invention.

While the above representative embodiments have been described with certain components in exemplary configurations, it will be understood by one of ordinary skill in the art that other representative embodiments can be implemented using different configurations and/or different components. For example, a robot comprising only a 2D sensor could be used without a 3D sensor being present. For example, a robot comprising only a 3D sensor could be used without a 2D sensor being present. For example, the number of object discrimination layers in the fully-connected neural network section is arbitrary; three layers are described herein only as an example.

For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system comprising:
    a mobile robot, the robot comprising a two-dimensional (2D) sensor, the 2D sensor configured to provide spatial data about a frontward facing surface of one or more nearby objects, the 2D sensor further configured to provide infrared data related to one or more of a shape, a size, a type, a reflectivity, and a location of the object,
    the robot further comprising a three-dimensional (3D) sensor, the 3D sensor configured to provide spatial data about the frontward facing surface of one or more nearby objects, the 3D sensor further configured to provide infrared data related to one or more of the shape, the size, the type, the reflectivity, and the location of the object; and
    a server operably connected to the robot over a network, the server configured to manage the robot, the server further configured to provide the robot with location data regarding one or more of a location of the robot, a destination of the robot, and the location of the object;
    the robot being configured to detect the object by processing sensor data using a convolutional neural network, the convolutional neural network being configured to determine one or more of information about the location of the object and information about the type of the object;
    the server being configured to train the convolutional neural network while the server is not managing the robot by being in an offline status,
    wherein the training comprises using a plurality of examples of an input to the convolutional neural network and a corresponding desired output from the convolutional neural network.

2. The system of claim 1, wherein the 2D sensor comprises a light detection and ranging (LIDAR) sensor.

3. The system of claim 1, wherein the object is selected from the group consisting of another robot, a forklift, a golf cart, an autonomous guided vehicles (AGV), a vehicle, and a shelf.

4. The system of claim 1, wherein the type of the object is selected from the group consisting of a vehicle, a robot, a cart, a landmark, a stationary object, a warehouse, and an inventory shelf.

5. The system of claim 1, wherein one or more of the 2D sensor and the 3D sensor is further configured to detect an object that is onboard the robot.

* * * * *